US012808678B2

(12) United States Patent
Nishio et al.

(10) Patent No.: US 12,808,678 B2
(45) Date of Patent: Nov. 24, 2026

(54) CONTROL METHOD AND VEHICLE

(71) Applicant: PANASONIC AUTOMOTIVE SYSTEMS CO., LTD., Kanagawa (JP)

(72) Inventors: Tsuyoshi Nishio, Chiba (JP); Toshihiro Miyamichi, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 25 days.

(21) Appl. No.: 19/039,519

(22) Filed: Jan. 28, 2025

(65) Prior Publication Data

US 2025/0244135 A1 Jul. 31, 2025

(30) Foreign Application Priority Data

Jan. 31, 2024 (JP) .................................. 2024-013434

(51) Int. Cl.
*G01C 21/36* (2006.01)

(52) U.S. Cl.
CPC .................................. *G01C 21/3626* (2013.01)

(58) Field of Classification Search
CPC .................................................. G01C 21/3626
See application file for complete search history.

(56) References Cited

U.S. PATENT DOCUMENTS

2018/0245929 A1* 8/2018 Watanabe .......... G01C 21/3848
2020/0018602 A1* 1/2020 Beaurepaire ........... G08G 1/146
2021/0231445 A1* 7/2021 Migita ............... G01C 21/3438
2022/0099459 A1 3/2022 Watanabe
2022/0109739 A1* 4/2022 Fields ................... G06F 16/258
2022/0321843 A1 10/2022 Komamine et al.
2023/0055974 A1* 2/2023 Arnold ............... G01C 21/3461
2023/0202501 A1 6/2023 Onimaru et al.

FOREIGN PATENT DOCUMENTS

JP 2003-323696 A 11/2003
JP 2011-114482 A 6/2011
JP 2015-151750 A 8/2015
JP 2021-170237 A 10/2021
JP 2022-157556 A 10/2022
JP 2022-163556 A 10/2022
JP 7335317 B2 8/2023
JP 2023-174913 A 12/2023
WO WO2020-250719 A1 12/2020

OTHER PUBLICATIONS

Office Action issued in Japanese family member No. JP 2024-013434, dated Sep. 30, 2025, together with an English language translation.

* cited by examiner

*Primary Examiner* — Naeem Taslim Alam
(74) *Attorney, Agent, or Firm* — Greenblum & Bernstein, P.L.C.

(57) ABSTRACT

A control method includes displaying, on a display device, a first route to a predetermined destination and a second route different from the first route, the second route displayed on the display device also indicating that information outside the vehicle is collected while the vehicle is traveling along the second route and the information is transmitted to exterior; displaying, on the display device, a guidance display for guiding the second route when the second route is selected by operating an input device; acquiring, by an external information acquisition device, vehicle external information on the second route; and transmitting, by a transmission device, the vehicle external information to exterior.

12 Claims, 25 Drawing Sheets

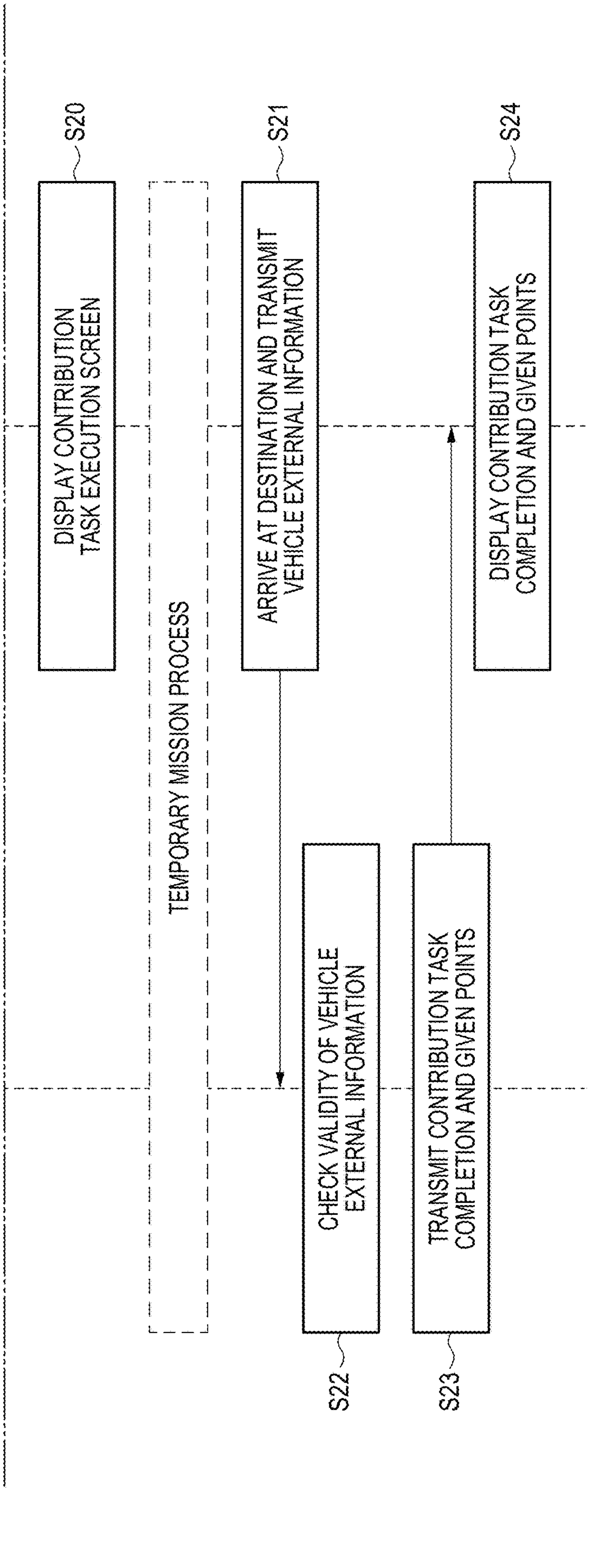
(FIG. 3 CONTINUED)

(FIG. 17 CONTINUED)
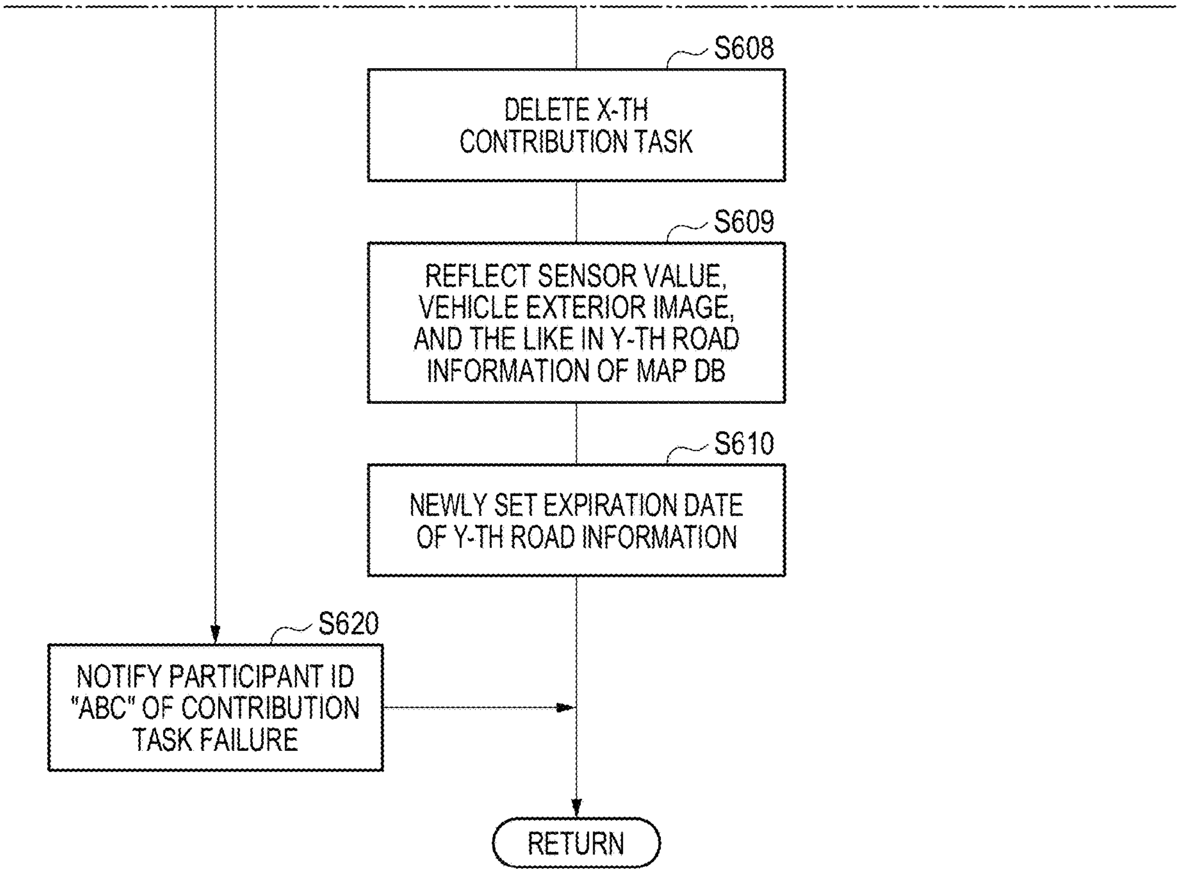

(CONT.)

(FIG. 18 CONTINUED)
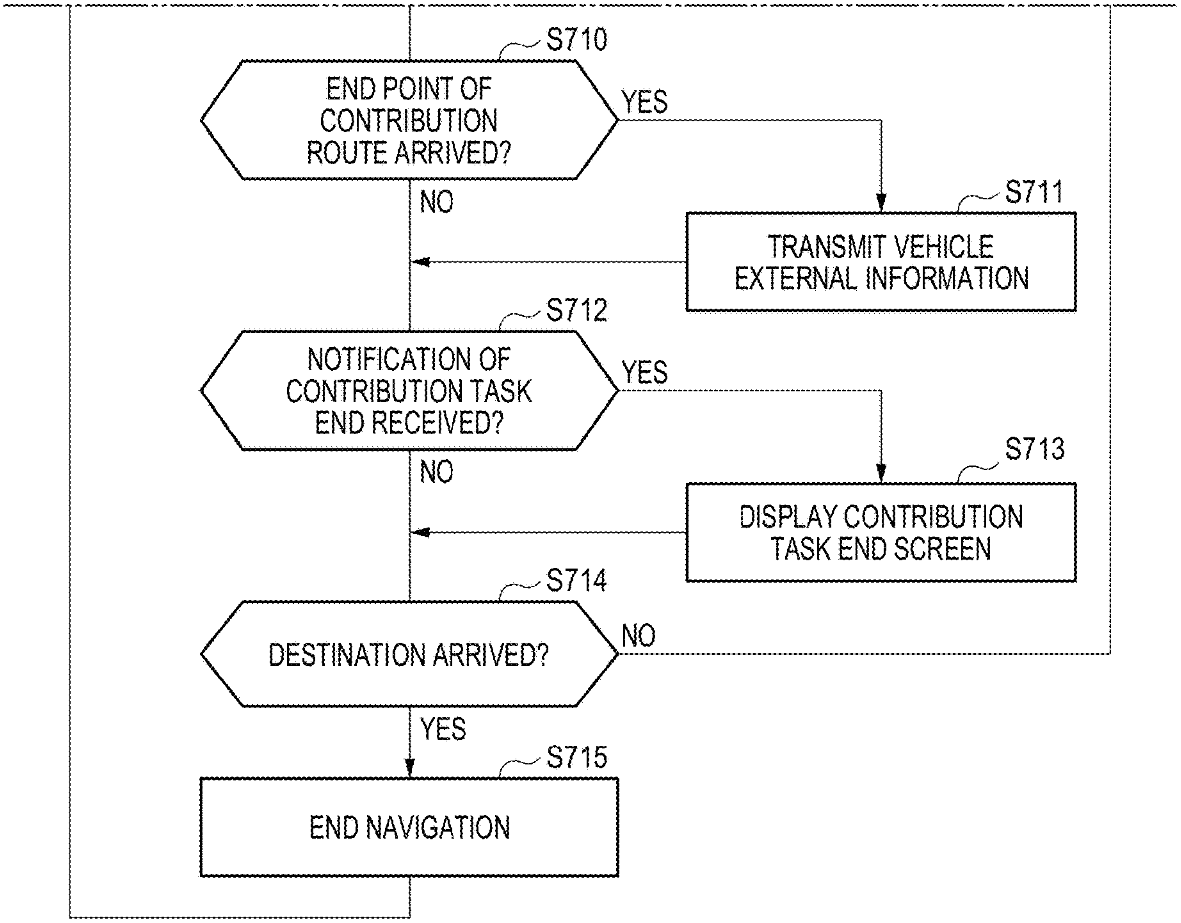

CONTROL METHOD AND VEHICLE

TECHNICAL FIELD

The present disclosure relates to a control method and a vehicle.

BACKGROUND ART

It has been studied to grasp the situation of a road by causing a vehicle traveling on the road to acquire information indicating the situation of the road and collecting the information acquired by each vehicle (see Patent Literatures 1, 2, and 3).

CITATION LIST

Patent Literature

Patent Literature 1: JP2003-323696A
Patent Literature 2: JP2011-114482A
Patent Literature 3: JP2015-151750A

SUMMARY OF INVENTION

However, the vehicle does not always travel immediately on a road whose situation is to be grasped, and for example, the situation of a road with small traffic volume is not grasped for a long period.

An object of the present disclosure is to provide a technique for collecting information related to a desired road more efficiently.

A control method according to the present disclosure is for a display device, an input device, an external information acquisition device, and a transmission device mounted on a vehicle. The control method includes displaying, on the display device, a first route to a predetermined destination and a second route different from the first route, the second route displayed on the display device also indicating that information outside the vehicle is collected while the vehicle is traveling along the second route and the information is transmitted to exterior;

- displaying, on the display device, a guidance display for guiding the second route when the second route is selected by operating the input device;
- acquiring, by the external information acquisition device, vehicle external information on the second route; and
- transmitting, by the transmission device, the vehicle external information to exterior.

A vehicle according to the present disclosure includes a display device; an input device; an external information acquisition device; and a transmission device. The display device displays a first route to a predetermined destination and a second route different from the first route, the second route displayed on the display device also indicates that information outside the vehicle is collected during traveling of the second route and is transmitted to exterior, and the display device displays a guidance display for guiding the second route when the second route is selected by operating the input device, the external information acquisition device acquires vehicle external information on the second route, and the transmission device transmits the vehicle external information to exterior.

These comprehensive or specific aspects may be implemented by a system, a device, a method, an integrated circuit, a computer program, or a recording medium, or any combination of the system, the device, the method, the integrated circuit, the computer program, and the recording medium.

According to the present disclosure, information related to a desired road can be collected more efficiently.

DESCRIPTION OF EMBODIMENTS

Hereinafter, embodiments of the present disclosure will be described in detail with reference to the drawings as appropriate. However, unnecessarily detailed description may be omitted. For example, detailed description of already well-known matters and redundant description of substantially the same configuration may be omitted. This is to avoid unnecessary redundancy of the following description and to facilitate understanding of those skilled in the art. The accompanying drawings and the following description are provided for those skilled in the art to sufficiently understand the present disclosure, and are not intended to limit the subject matter described in claims.

Embodiment 1

Figure 1:
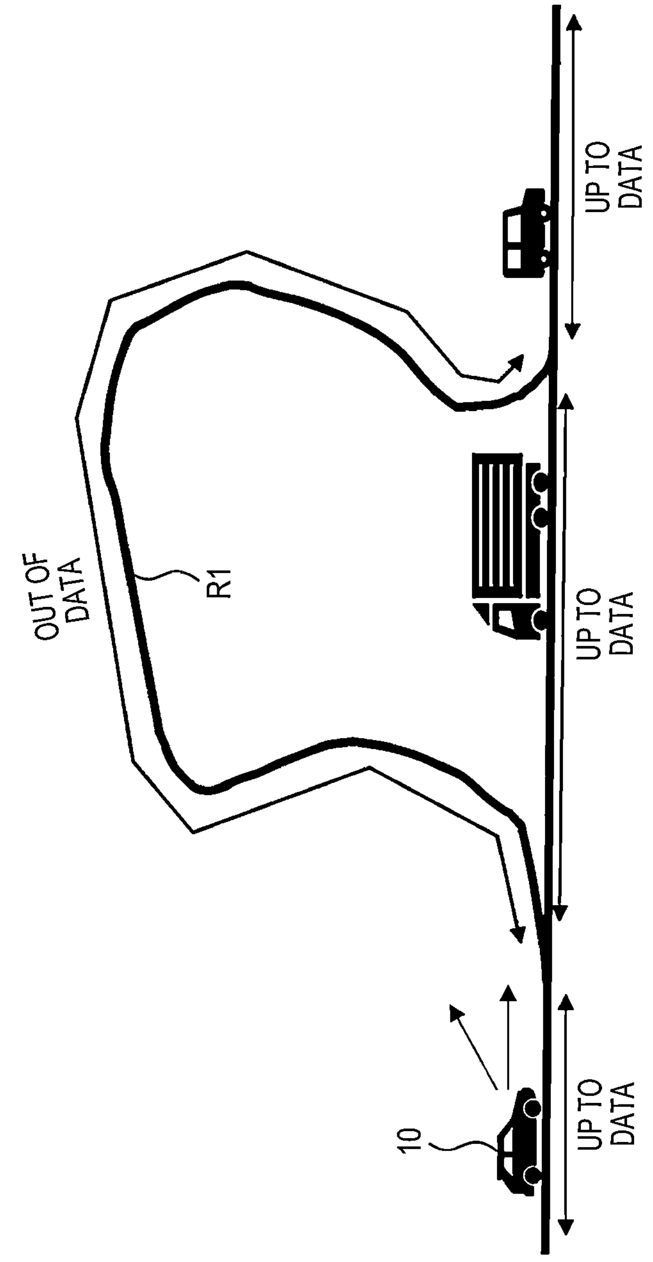
FIG. 1 is a conceptual diagram illustrating updating of road information according to Embodiment 1.

FIG. 1 is a conceptual diagram illustrating updating of road information according to Embodiment 1.

In order to spread autonomous driving and realize digital twin in a town, collection of road information indicating a road and a situation around the road is required. However, road information collected in the past does not correctly reflect the current road and the situation around the road, which causes a problem in use. Therefore, it is necessary to update the road information collected in the past to the latest road information. For example, in FIG. 1, when the road information on a road R1 has expired, it is necessary to update the road information on the road R1 to the latest road information.

Figure 2:
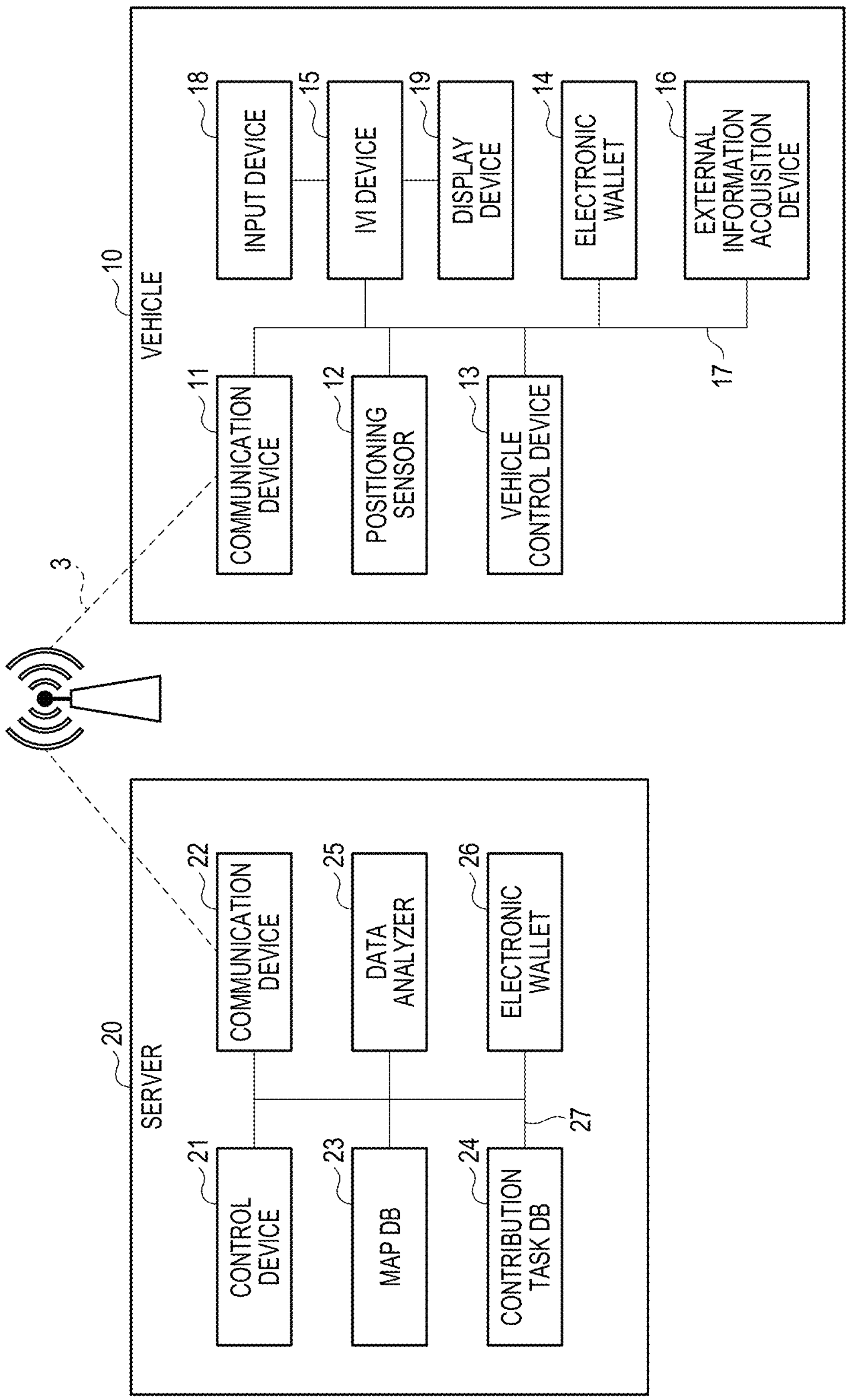
FIG. 2 is a block diagram illustrating a configuration example of a road information collection system according to Embodiment 1.

The vehicle 10 acquires vehicle external information which is information indicating the road R1 and a situation around the road R1 while traveling on the road R1, and transmits the vehicle external information to the server 20 (see FIG. 2). The server 20 updates the road information on the road R1 based on the vehicle external information collected from the vehicle 10.

However, for example, when the traffic volume of the road R1 is small, the vehicle 10 does not travel on the road R1 easily, and the server 20 may not be able to update the road information on the road R1 that has expired to the latest road information for a long period.

In the present embodiment, a road information collection system 1 (see FIG. 2) and a method for updating road information on a road that has expired to the latest road information will be described. The road information may include various kinds of information such as 3D map data of a predetermined section of a road, a roadside landscape, an obstacle, weather, and the number of people.

<System Configuration>

FIG. 2 is a block diagram illustrating a configuration example of the road information collection system 1 according to Embodiment 1.

The road information collection system 1 includes at least one vehicle 10 and a server 20. The vehicle 10 and the server 20 can transmit and receive data via a predetermined communication network 3. Examples of the communication network 3 include a cellular communication network (LTE, 4G, 5G, etc.), satellite communication, an ITS spot, or a wireless LAN.

The vehicle 10 includes a communication device 11, a positioning sensor 12, a vehicle control device 13, an electronic wallet 14, an IVI device 15, and an external information acquisition device 16. These devices may be connected to an in-vehicle network 17 and be able to transmit and receive information to and from each other. Examples of the in-vehicle network 17 include Controller Area Network (CAN), Local Interconnect Network (LIN), FlexRay, Gigabit Video Interface (GVIF), PFD-link, and Gigabit Multimedia Serial Link (GMSL).

The communication device 11 is a device (for example, wireless communication circuit) that is connected to the communication network 3 and controls transmission and reception of data. The communication device 11 includes a transmission device that controls transmission of data and a reception device that controls reception of data.

The positioning sensor 12 receives, for example, positioning signals of global navigation satellite systems (GNSS) and measures a current position of the vehicle 10.

The vehicle control device 13 is a device that controls traveling of the vehicle 10. The vehicle control device 13 obtains, for example, information on traveling speed, acceleration, and deceleration of the vehicle 10, and information on forward movement, backward movement, right turn, and left turn.

The electronic wallet 14 holds and manages points as an example of an incentive. Although details of the incentive and the points will be described later, a user of the vehicle 10 is given points in accordance with a contribution to collection of road information that has expired, and the electronic wallet 14 holds and manages the points.

The IVI device 15 provides various kinds of information to the user of the vehicle 10. IVI is an abbreviation for "in-vehicle infotainment". The IVI device 15 may include a car navigation function. For example, the IVI device 15 performs navigation to a destination. An input device 18 and a display device 19 are connected to the IVI device 15. The IVI device 15 may be a device with a touch panel integrated with the input device 18 and the display device 19 or a mobile terminal of a user. Alternatively, the IVI device 15 may be a device integrated with the display device 19, and the input device 18 may be a separate touch pad. When the IVI device 15 is a mobile terminal, the communication device 11 may be incorporated in the mobile terminal.

The external information acquisition device 16 is mounted on the vehicle 10 and acquires vehicle external information indicating a road and a situation around the road. The external information acquisition device 16 may include a camera that is mounted on the vehicle 10 and acquires an external image. The camera may be an entire periphery camera. Alternatively, the camera may be mounted on a mobile terminal. In the following description, an image captured by the camera may be referred to as a vehicle exterior image. The external information acquisition device 16 may include a sonar that is mounted on the vehicle 10 and detects an external obstacle using sound waves. The external information acquisition device 16 may include a radar that is mounted on the vehicle 10 and detects an external obstacle using electromagnetic waves. The external information acquisition device 16 may include a speedometer that is mounted on the vehicle 10 and detects a speed of the vehicle 10. The external information acquisition device 16 may include an accelerometer that is mounted on the vehicle 10 and detects an acceleration of the vehicle 10. The external information acquisition device 16 may include an angular accelerometer that is mounted on the vehicle 10 and detects an angular acceleration of the vehicle 10. In the following description, a value detected by a sonar, a radar, a speedometer, an accelerometer or each accelerometer may be referred to as a sensor value. The vehicle external information may include position information measured by the positioning sensor 12, a time at which the position is measured, a vehicle exterior image captured at the position, and a sensor value detected at the position in association with each other.

The server 20 includes a control device 21, a communication device 22, a map DB 23, a contribution task DB 24, a data analyzer 25, and an electronic wallet 26. The DB is an abbreviation for "database". These devices may be connected to a bus 27 to transmit and receive data to and from each other.

The control device 21 executes a process for realizing the functions of the server 20. The control device 21 may include a processor and a volatile or nonvolatile memory. The processor may implement the functions of the server 20 by executing a predetermined computer program stored in the memory.

The communication device 22 is a device that is connected to the communication network 3 and controls transmission and reception of data.

The map DB 23 manages a road map used for route search as a database. The map DB 23 manages road information on each road and an expiration date thereof. The road information includes, for example, 3D map information on a road and its surroundings, obstacle information such as construction work, weather, and disaster, and update date and time of the road information. The map DB 23 may be implemented in a nonvolatile storage (for example, a solid state drive (SSD) or a hard disk drive (HDD)) included in the server 20.

The contribution task DB 24 manages a contribution task, which is a task contributing to update of road information, as a database. Although details of the contribution task will be described later, when the user of the vehicle 10 participates in the contribution task and completes the contribution task, the user can obtain an incentive (points). The contribution task DB 24 manages the user or the vehicle 10 participating in the contribution task. The map DB 23 may be implemented as a nonvolatile storage included in the server 20.

The data analyzer 25 analyzes whether the vehicle external information received from the vehicle 10 is effective for use as road information. In response to determining that the vehicle external information is valid, the data analyzer 25 may reflect the content of the vehicle external information in the road information of the map DB 23. The data analyzer 25 may be included in the control device 21.

The electronic wallet 26 holds and manages a resource of an incentive (for example, points) given to the user of the vehicle 10 who has completed the contribution task.

<Sequence Chart>

Figure 3:
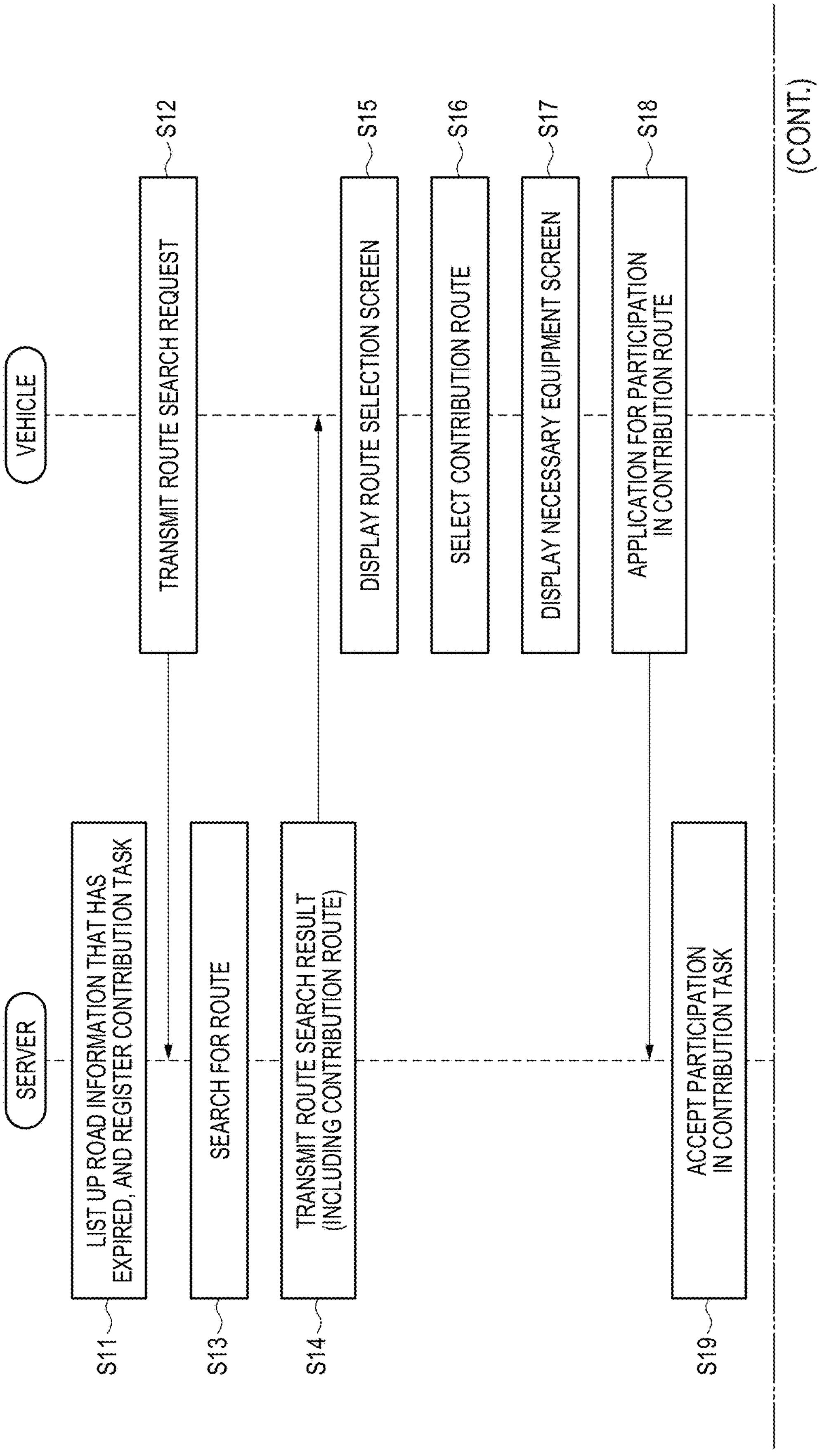
FIG. 3 is a sequence chart illustrating a process of the road information collection system according to Embodiment 1.
Figure 4:
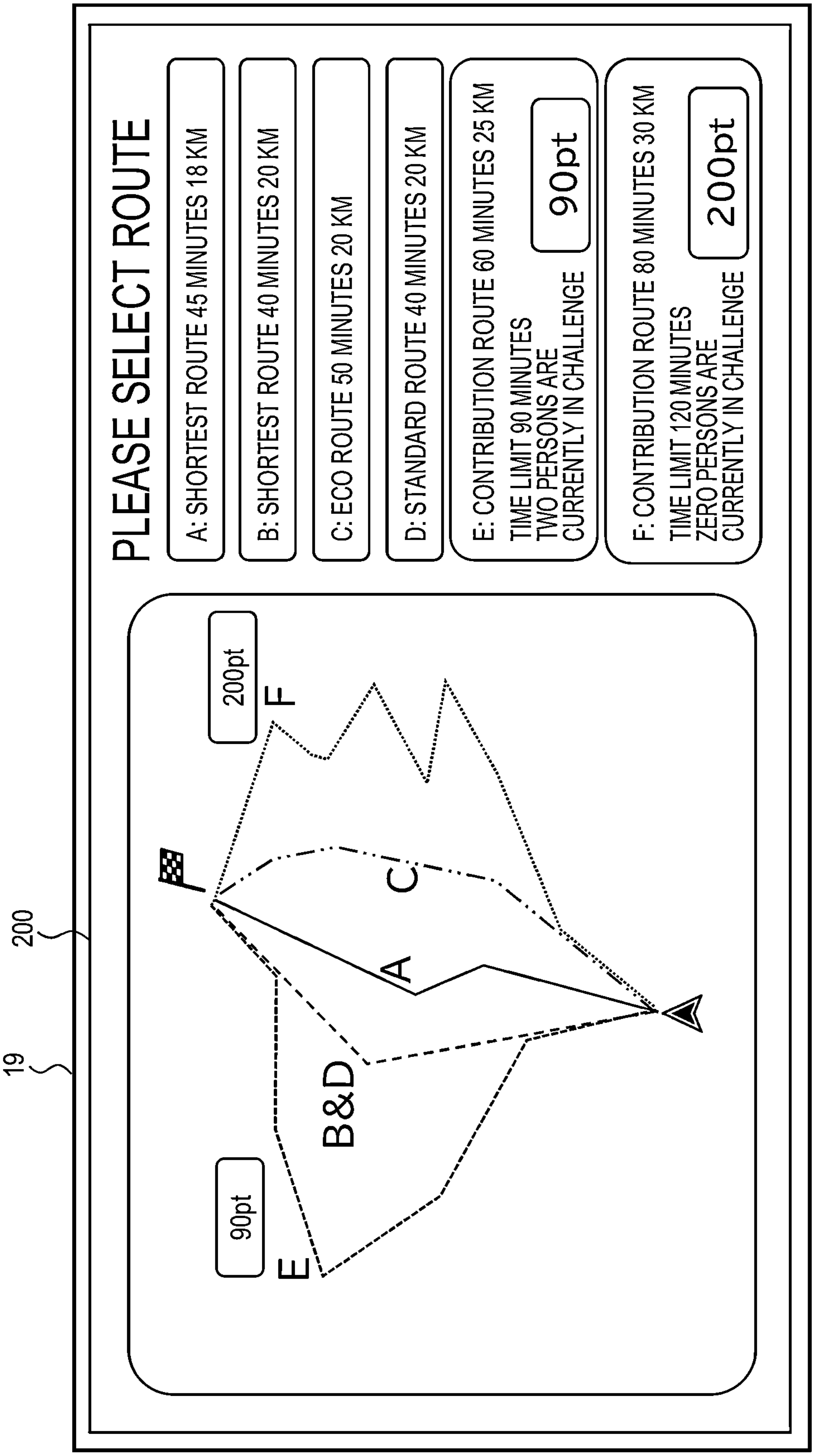
FIG. 4 is a diagram illustrating an example of a route selection screen according to Embodiment 1.
Figure 5:
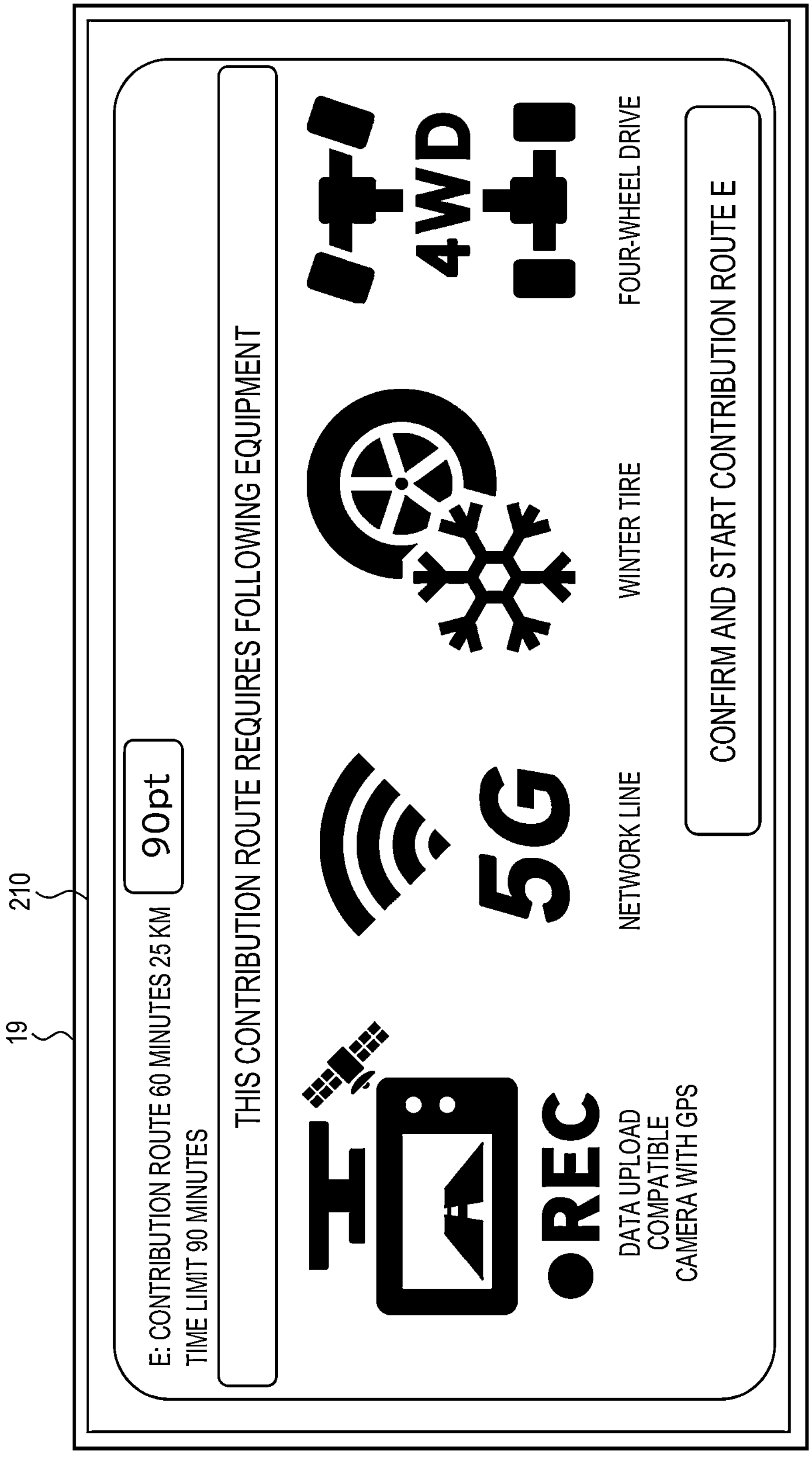
FIG. 5 is a diagram illustrating an example of a necessary equipment screen according to Embodiment 1.
Figure 6:
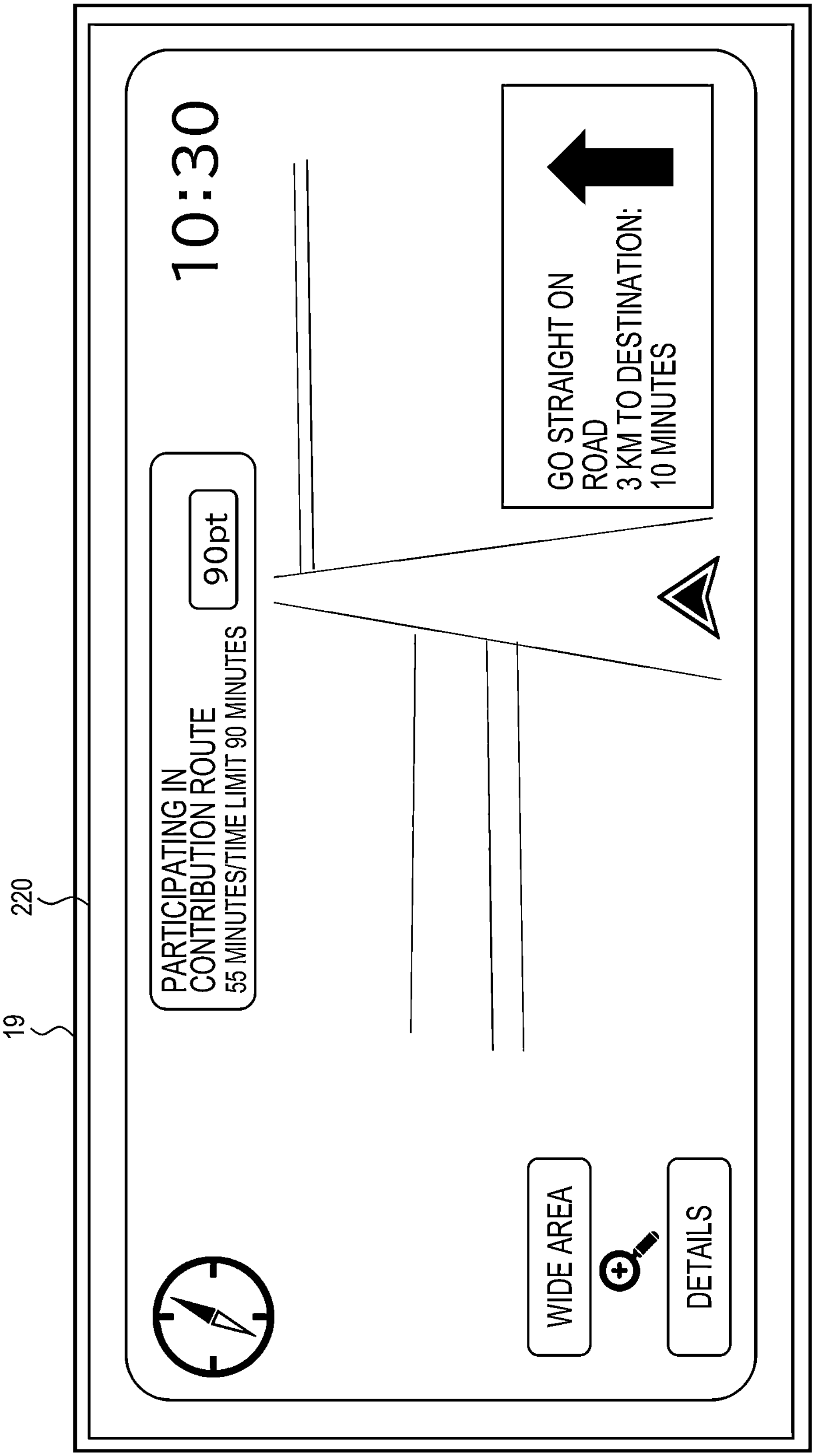
FIG. 6 is a diagram illustrating an example of a contribution task execution screen according to Embodiment 1.
Figure 7:
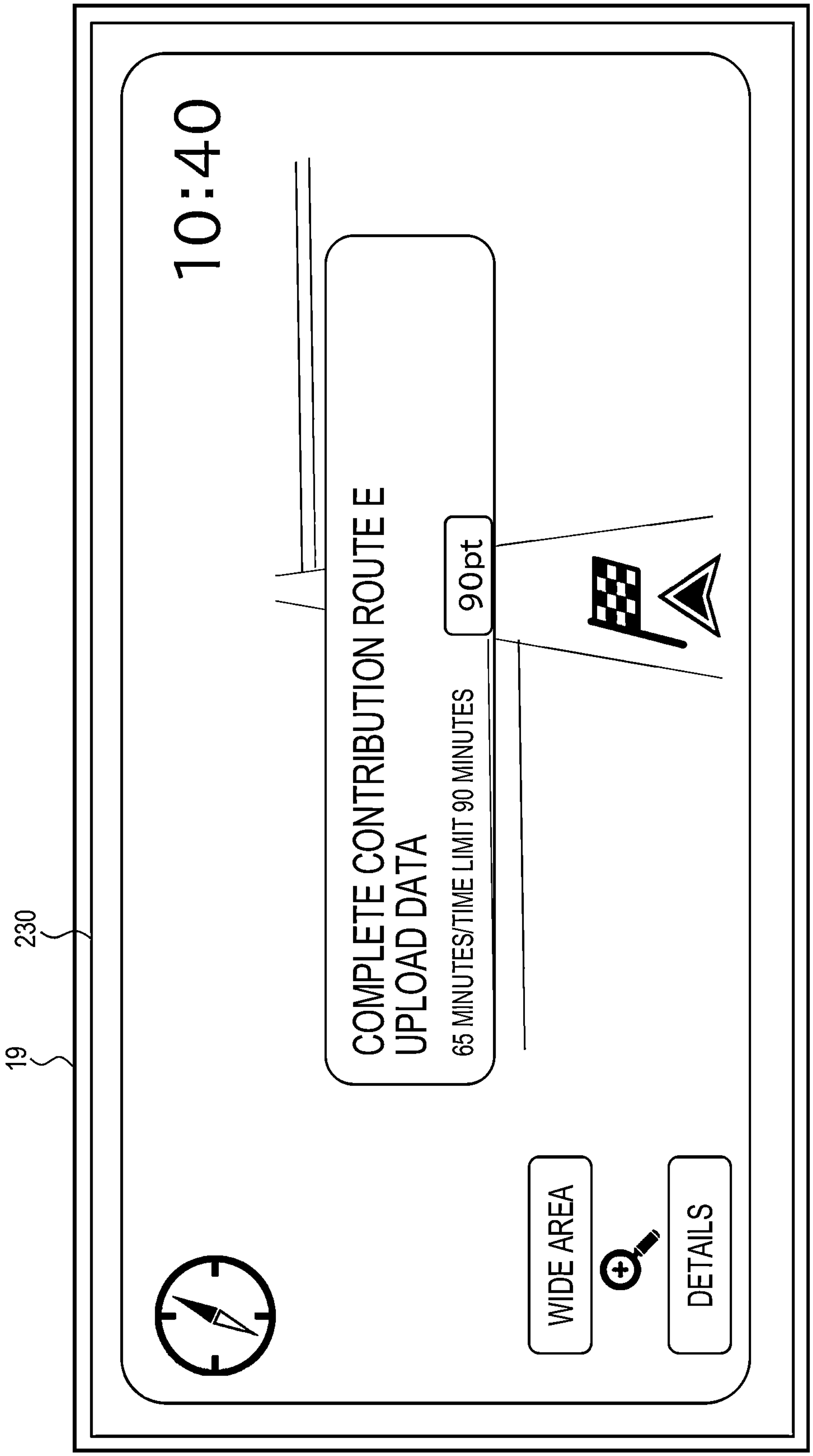
FIG. 7 is a diagram illustrating an example of a contribution task completion screen according to Embodiment 1.
Figure 8:
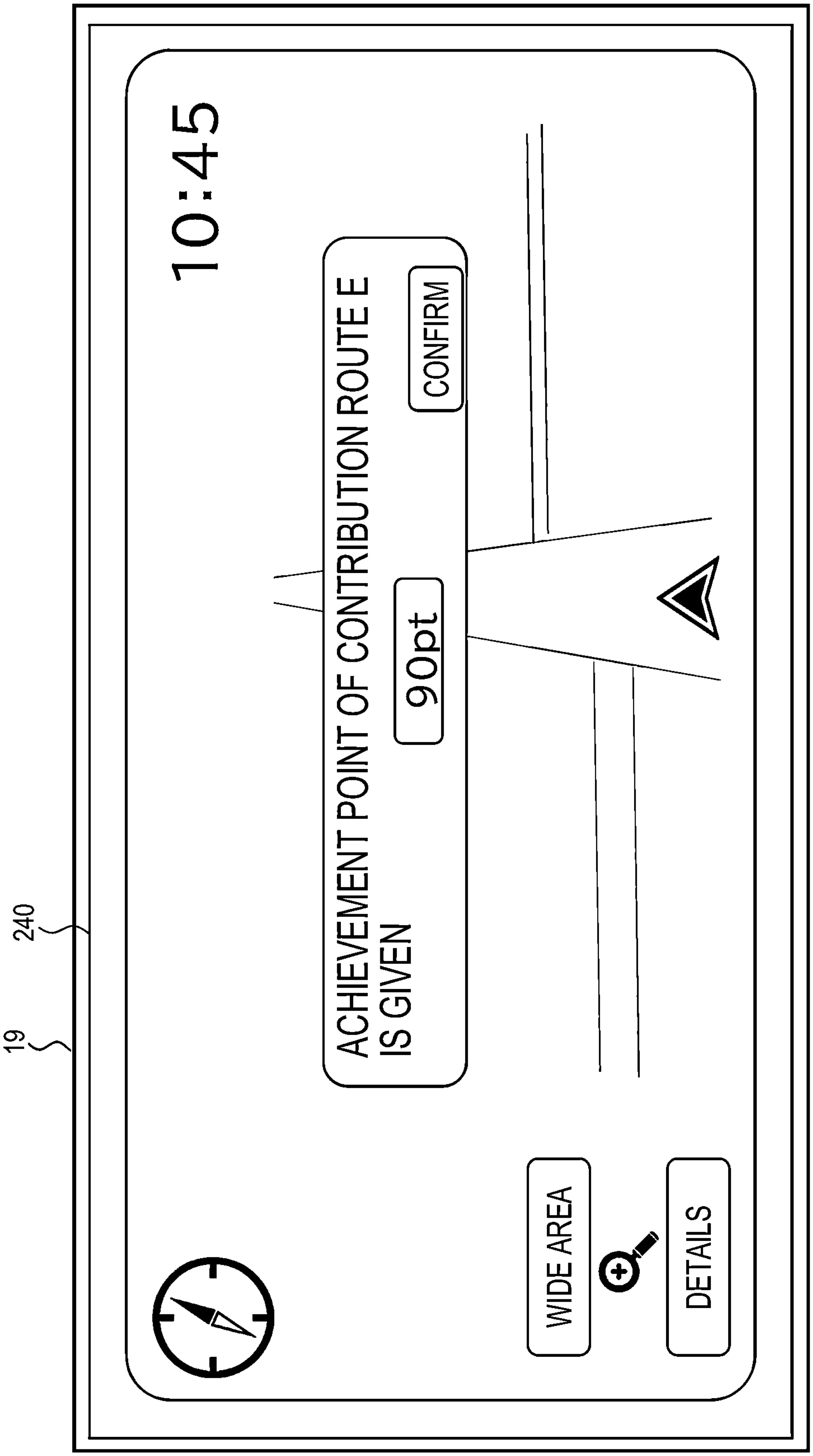
FIG. 8 is a diagram illustrating an example of a point-giving screen according to Embodiment 1.
Figure 9:
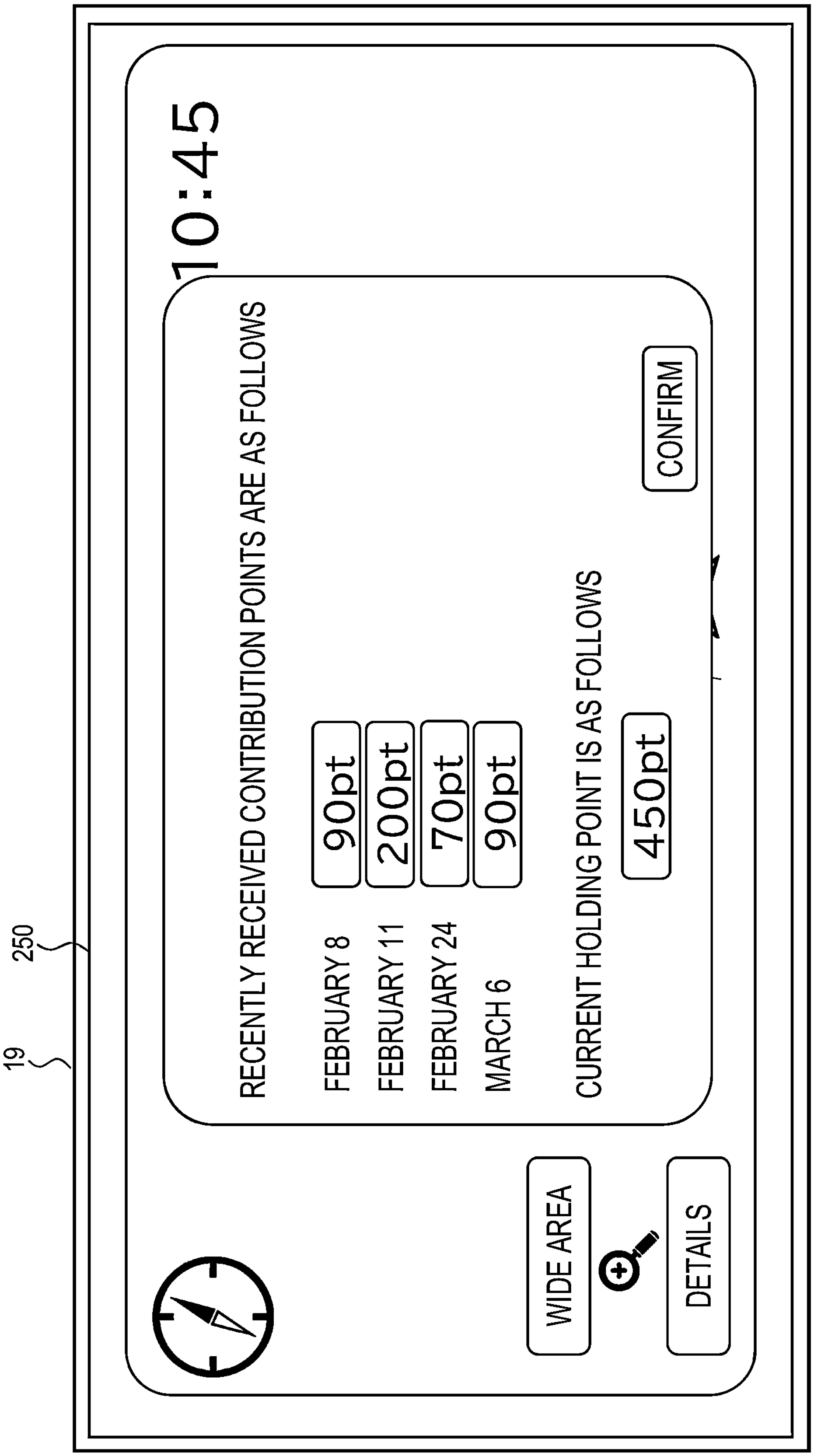
FIG. 9 is a diagram illustrating an example of a point list screen according to Embodiment 1.

FIG. 3 is a sequence chart illustrating a process of the road information collection system 1 according to Embodiment 1. FIG. 4 is a diagram illustrating an example of a route selection screen 200 according to Embodiment 1. FIG. 5 is a diagram illustrating an example of a necessary equipment screen 210 according to Embodiment 1. FIG. 6 is a diagram illustrating an example of a contribution task execution screen 220 according to Embodiment 1. FIG. 7 is a diagram illustrating an example of a contribution task completion screen 230 according to Embodiment 1. FIG. 8 is a diagram illustrating an example of a point-giving screen 240 according to Embodiment 1. FIG. 9 is a diagram illustrating an example of a point list screen 250 according to Embodiment 1. Next, an outline of processes executed by the server 20 and the vehicle 10 will be described with reference to FIGS. 3 to 9. In the following description, the processes executed by the vehicle 10 may be read as processes executed by the IVI device 15 or another device included in the vehicle 10, and processes executed by the server 20 may be read as processes executed by the control device 21 or another device included in the server 20.

The server 20 lists up the road information that has expired, and registers, in the contribution task DB 24, a contribution task for collecting the road information (S11). The contribution task includes at least a contribution route for updating road information that has expired.

The vehicle 10 generates a route search request that requests a search for a route from a current location to a destination, and transmits the route search request to the server 20 (S12). The current location may be specified by the positioning sensor 12. The destination may be input by the user operating the input device 18.

The server 20 receives the route search request from the vehicle 10 and searches for a route from the current location to the destination (S13). At this time, the server 20 searches the contribution task DB 24 for a contribution route from the current location to the destination in addition to a general route from the current location to the destination. The server 20 calculates points to be given to the user when the user has completed the contribution route (that is, when the contribution task has been completed).

The server 20 transmits a route search result including a general route, a contribution route, and points to the vehicle 10 (S14).

The vehicle 10 displays a route selection screen 200 as illustrated in FIG. 4 on the display device 19 based on the route search result received from the server 20 (S15). For example, the route selection screen 200 displays, as a general route, a shortest route (A) having a shortest distance from the current location to the destination, a fastest route (B) having a shortest time from the current location to the destination, an ECO route (C) having a minimum fuel efficiency from the current location to the destination, and a standard route (D) which is a standard route from the current location to the destination. In addition, the route selection screen displays contribution routes (E) and (F) that can reach the destination from the current location, time limits of the contribution routes, the number of participants in the contribution routes, and points given when the user has completed the contribution routes.

Here, it is assumed that the user selects a contribution route from the route selection screen 200 (S16).

In this case, as illustrated in FIG. 5, the vehicle 10 displays, on the display device 19, the necessary equipment screen 210 indicating equipment necessary for completing the selected contribution route (S17). The necessary equipment screen 210 displays, for example, a camera for capturing a vehicle exterior image, a line for connecting to the communication network 3 (for example, cellular communication network), winter tires when snow lies on the contribution route, and four-wheel drive when the road of the contribution route is bad. Accordingly, the user can know necessary equipment before participating in the contribution task, and can participate in the contribution task reliably and safely.

When the user confirms and approves in the necessary equipment screen 210, the vehicle 10 transmits, to the server 20, an application for the participation in the selected contribution route (S18).

When receiving the application for the participation in the contribution route, the server 20 accepts participation of the user of the vehicle 10 in the contribution task including the contribution route (S19).

During execution of the contribution task, the vehicle 10 displays a contribution task execution screen 220 as illustrated in FIG. 6 on the display device (S20). For example, the contribution task execution screen 220 displays a contribution route guidance (navigation), a time limit and/or a remaining time of the contribution task, and a point given when a contribution route is completed.

When the temporary mission occurs during the route traveling, the vehicle 10 and the server 20 execute a temporary mission process. Details of the temporary mission process will be described later (see FIG. 10).

While traveling along a road corresponding to the contribution route, the vehicle 10 collects vehicle external information through the external information acquisition device 16 and stores the vehicle external information in the memory. When the vehicle 10 arrives at the destination, the vehicle 10 transmits the vehicle external information to the server 20 (S21). At this time, the vehicle 10 displays a contribution task completion screen 230 illustrated in FIG. 7 on the display device 19. For example, the contribution task completion screen 230 displays the fact that the vehicle has completed the contribution route, the time required to complete the contribution route, the scheduled points to be given, and the fact that the vehicle external information is uploaded to the server 20.

The server 20 (data analyzer 25) checks the validity of the vehicle external information received from the vehicle 10 (S22). Details of the validity check will be described later (see FIG. 17).

When the validity check is successful, the server 20 updates the road information on the contribution route in the map DB 23 based on the vehicle external information. Then, the server 20 transmits information including the contribution task completion and the given points to the vehicle 10 (S23).

When the information in step S23 is received, the vehicle 10 displays a point-giving screen 240 as illustrated in FIG. 8 on the display device 19 (S24). For example, the point-giving screen 240 displays the completion of the contribution task and the given points. Further, the vehicle 10 may display a point list screen 250 as illustrated in FIG. 9. For example, on the point list screen 250, a list of recently given points and currently held points (that is, total points) are displayed. These points are held and managed by the electronic wallet 14 of the vehicle 10.

According to the above processes, the user of the vehicle 10 is more likely to select a contribution route for which an incentive (for example, points) is obtained as one of the routes to reach the destination, and as a result, there is a high possibility that the vehicle external information for updating the road information that has expired can be collected in a shorter period. That is, the road information collection system 1 can more efficiently collect vehicle external information for updating the road information that has expired.

<Sequence Chart of Temporary Mission>

Figure 10:
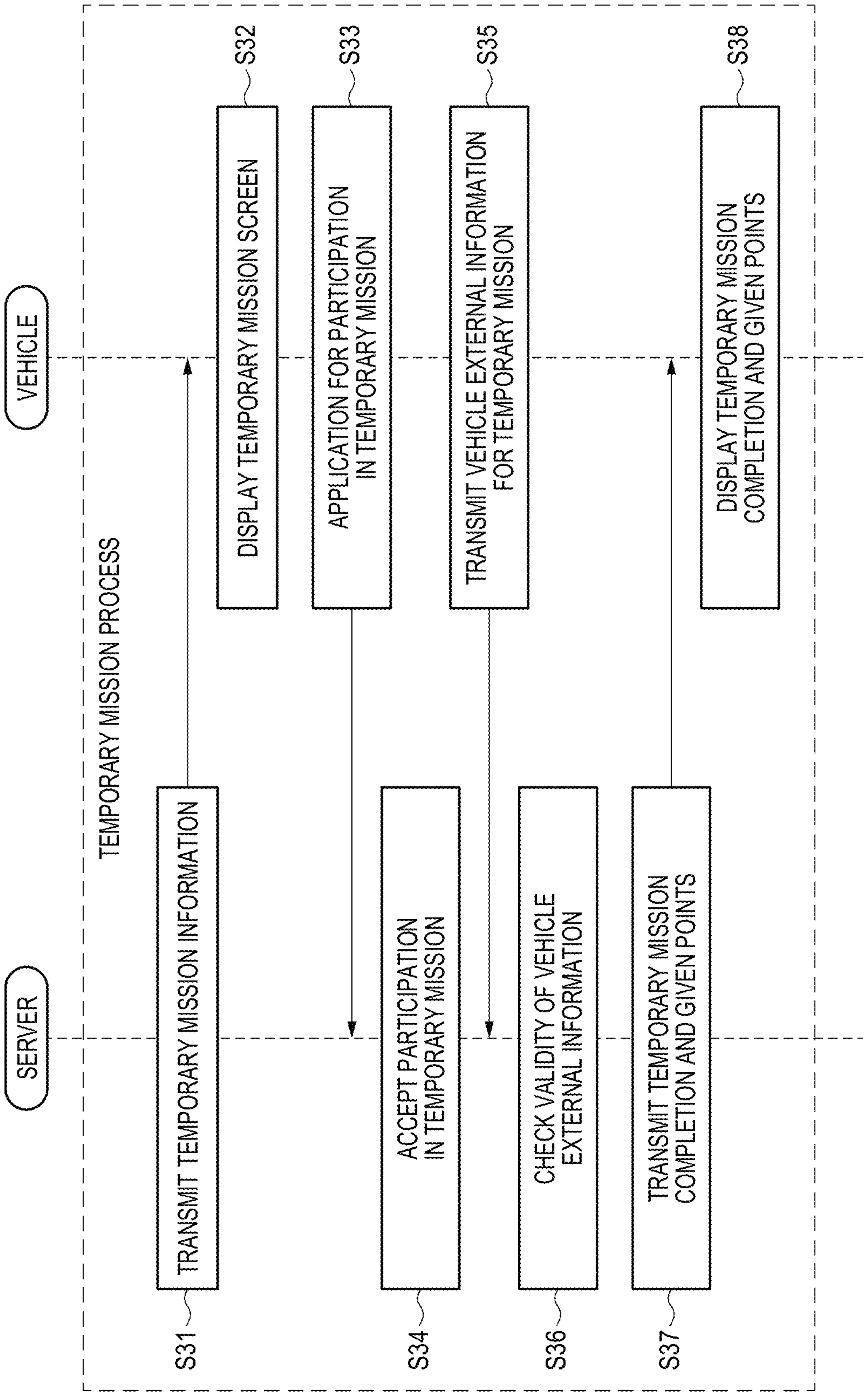
FIG. 10 is a sequence chart illustrating a process of a temporary mission according to Embodiment 1.
Figure 11:
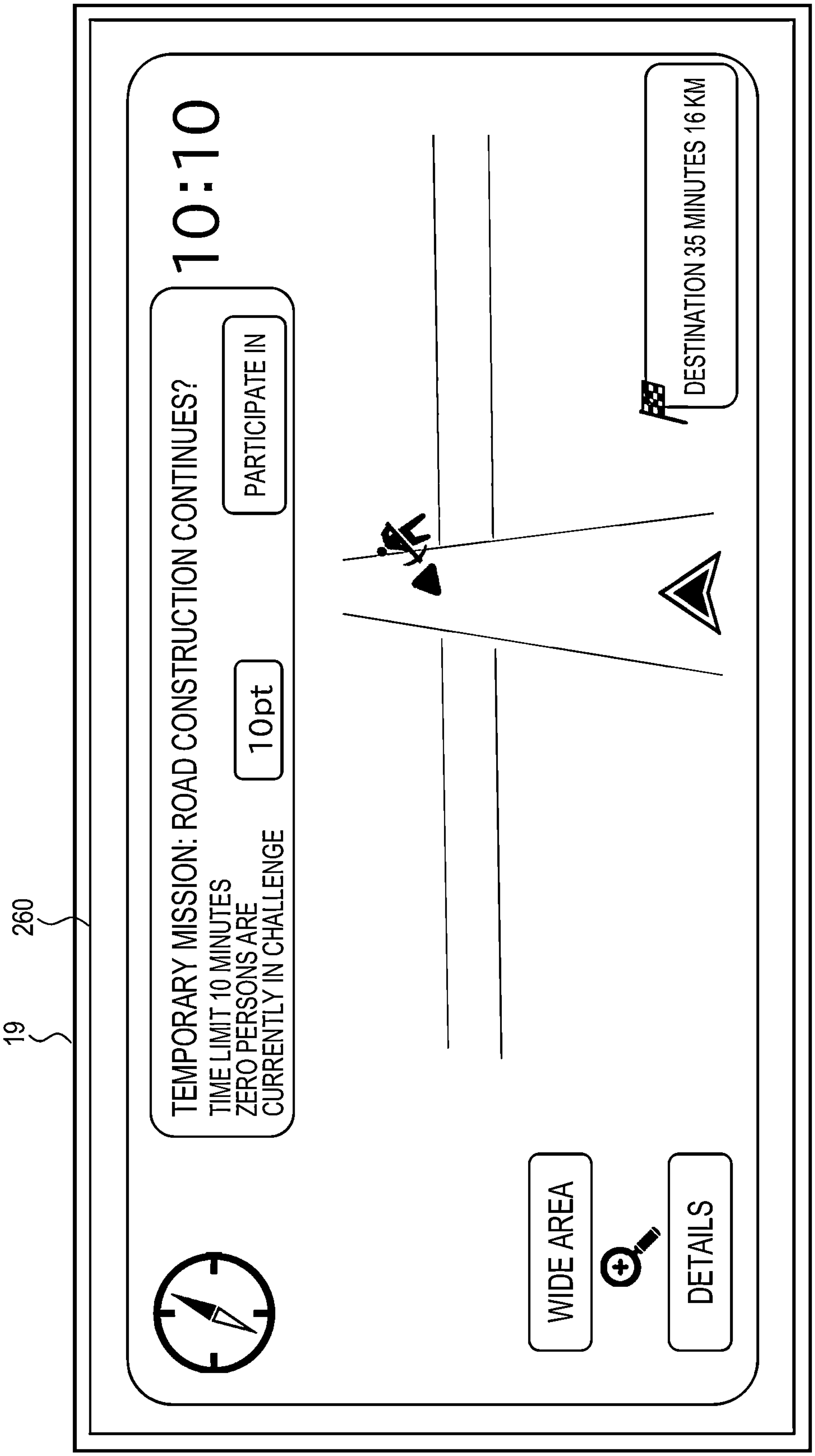
FIG. 11 is a diagram illustrating an example of a temporary mission screen according to Embodiment 1.

FIG. 10 is a sequence chart illustrating a process of a temporary mission according to Embodiment 1. FIG. 11 is a diagram illustrating an example of a temporary mission screen 260 according to Embodiment 1. Next, the temporary mission process illustrated in FIG. 3 will be described in detail with reference to FIGS. 10 and 11.

The server 20 transmits temporary mission information to the vehicle 10 (S31). For example, when the server 20 is desired to collect information such as whether road construction continues at a certain location, or whether the weather at a certain location is present, the temporary mission is a mission that is temporarily generated by the server 20 in order to collect the information. Similar to the contribution task, the temporary mission information includes a route to a location of the temporary mission, a time limit, a given point, and the like.

When the temporary mission information is received, the vehicle 10 displays a temporary mission screen 260 as illustrated in FIG. 11 (S32). For example, the content of the temporary mission, a route to a location of the temporary mission, the number of participants in the temporary mission, a time limit, and a given point are displayed on the temporary mission screen 260.

Here, when the user of the vehicle 10 selects participation in the temporary mission, the vehicle 10 transmits an application for the participation in the temporary mission to the server 20 (S33).

The server 20 receives the application for the participation in the temporary mission from the vehicle 10 and accepts participation in the temporary mission (S34).

When the temporary mission is completed, the vehicle 10 transmits, to the server 20, the vehicle external information collected during the temporary mission (S35).

The server 20 (data analyzer 25) checks the validity of the vehicle external information received from the vehicle 10 (S36).

When the validity check of the vehicle external information is successful, the server 20 updates road information on the location in the map DB 23 based on the vehicle external information. Then, the server 20 transmits information including the contribution mission completion and the given points to the vehicle 10 (S37).

When the information in step S37 is received, the vehicle 10 displays the point-giving screen 240 similar to that in FIG. 8 on the display device 19 (S38).

According to the above processes, the server 20 can efficiently collect information indicating the current situation of a desired location.

<Overall Process of Server>

Figure 12:
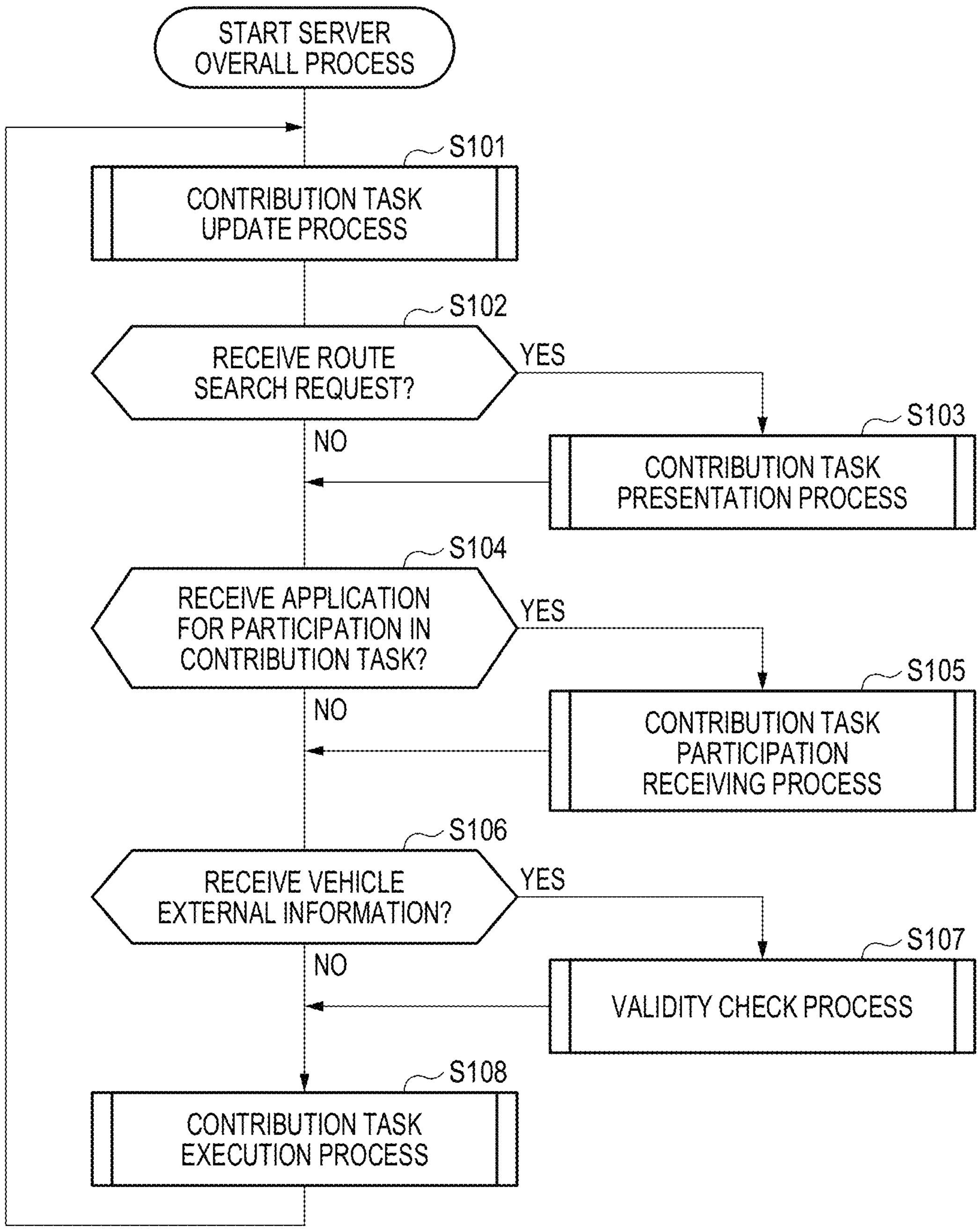
FIG. 12 is a flowchart illustrating an example of an overall process executed by a server according to Embodiment 1.

FIG. 12 is a flowchart illustrating an example of an overall process executed by the server 20 according to Embodiment 1. In the description of FIGS. 12 to 17, the processes mainly executed by the server 20 may be read as processes mainly executed by the control device 21 included in the server 20 or another device.

The server 20 executes a contribution task update process (S101). Although details of the contribution task update process will be described later (see FIG. 13), a contribution task is registered in the contribution task DB 24 by the process.

The server 20 determines whether a route search request is received from the vehicle 10 (S102).

When the route search request is not received (S102: NO), the server 20 causes the process to proceed to step S104. When the route search request is received (S102: YES), the server 20 executes a contribution task presentation process (S103), and then causes the process to proceed to step S104. Details of the contribution task presentation process will be described later (see FIG. 14).

The server 20 determines whether an application for the participation in the contribution task is received from the vehicle 10 (S104).

When the participation application for the contribution task is not received (S104: NO), the server 20 causes the process to proceed to step S106. When the application for the participation in the contribution task is received (S104: YES), the server 20 executes a contribution task participation receiving process (S105), and then causes the process to proceed to step S106. Details of the contribution task participation receiving process will be described later (see FIG. 15).

The server 20 determines whether the vehicle external information is received from the vehicle 10 (S106).

When the vehicle external information is not received (S106: NO), the server 20 causes the process to proceed to step S108. When the vehicle external information is received (S106: YES), the server 20 executes a validity check process (S107), and then causes the process to proceed to step S108. Details of the validity check process will be described later (see FIG. 17).

The server 20 executes a contribution task execution process (S108), and causes the process to return to step S101. Details of the contribution task execution process will be described later (see FIG. 16).

<Contribution Task Update Process>

Figure 13:
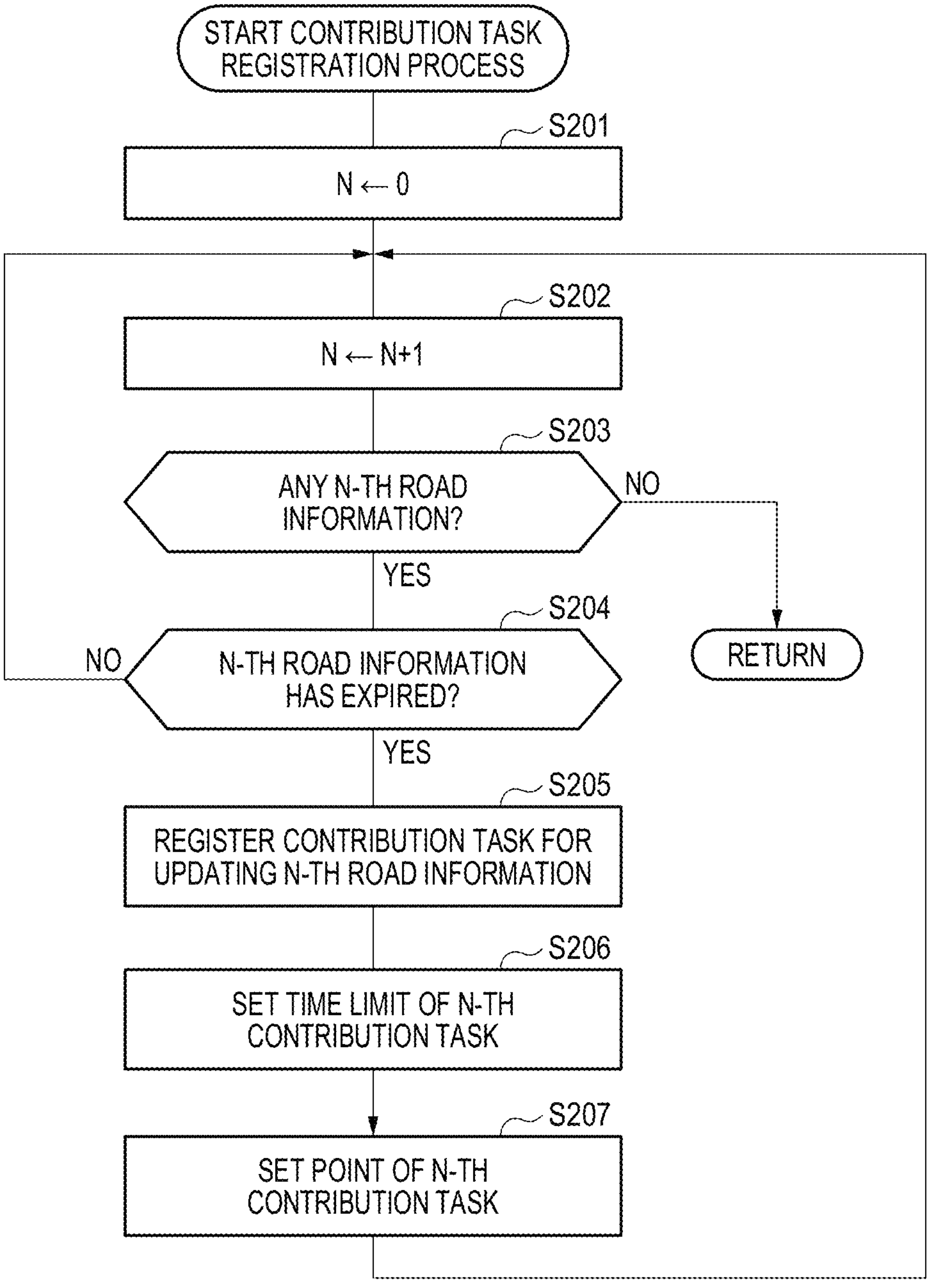
FIG. 13 is a flowchart illustrating an example of a contribution task update process executed by the server according to Embodiment 1.

FIG. 13 is a flowchart illustrating an example of the contribution task update process executed by the server 20 according to Embodiment 1. This process is called in step S101 of FIG. 12.

The server 20 substitutes (i.e., initializes) 0 for the variable N (S201).

The server 20 adds 1 to the variable N (S202).

The server 20 determines whether N-th road information exists in the map DB 23 (S203).

When the N-th road information does not exist (S203: NO), the server 20 completes this process and returns the process to a caller (S101).

When the N-th road information exists (S203: YES), the server 20 determines whether the N-th road information has expired (exceeded) (S204).

When the N-th road information has not expired (S204: NO), the server 20 causes the process to return to step S202.

When the N-th road information has expired (S204: YES), the server 20 registers the update of the N-th road information as an N-th contribution task in the contribution task DB 24 (S205). The contribution task includes a contribution route including a road section corresponding to the road information.

The server 20 sets a time limit for the N-th contribution task based on a distance of a contribution route related to the N-th contribution task and a time required to complete the contribution route (S206). For example, the time limit is set to a predetermined multiple (for example, 1.5 times) of the time required to complete the contribution route. The time required to complete the contribution route may be calculated by a route search method in the related art.

The server 20 sets points to be given to the user who completed the N-th contribution task based on a difficulty level, a required time, and/or a distance of the N-th contribution task (S207), and registers the points in the contribution task DB 24. A value of the point to be given may be, for example, a value to cover the electric consumption or the fuel efficiency required to complete the contribution task. Then, the server 20 causes the process to return to step S202.

Through the above processes, the contribution task is registered in the contribution task DB 24.

<Contribution Task Presentation Process>

Figure 14:
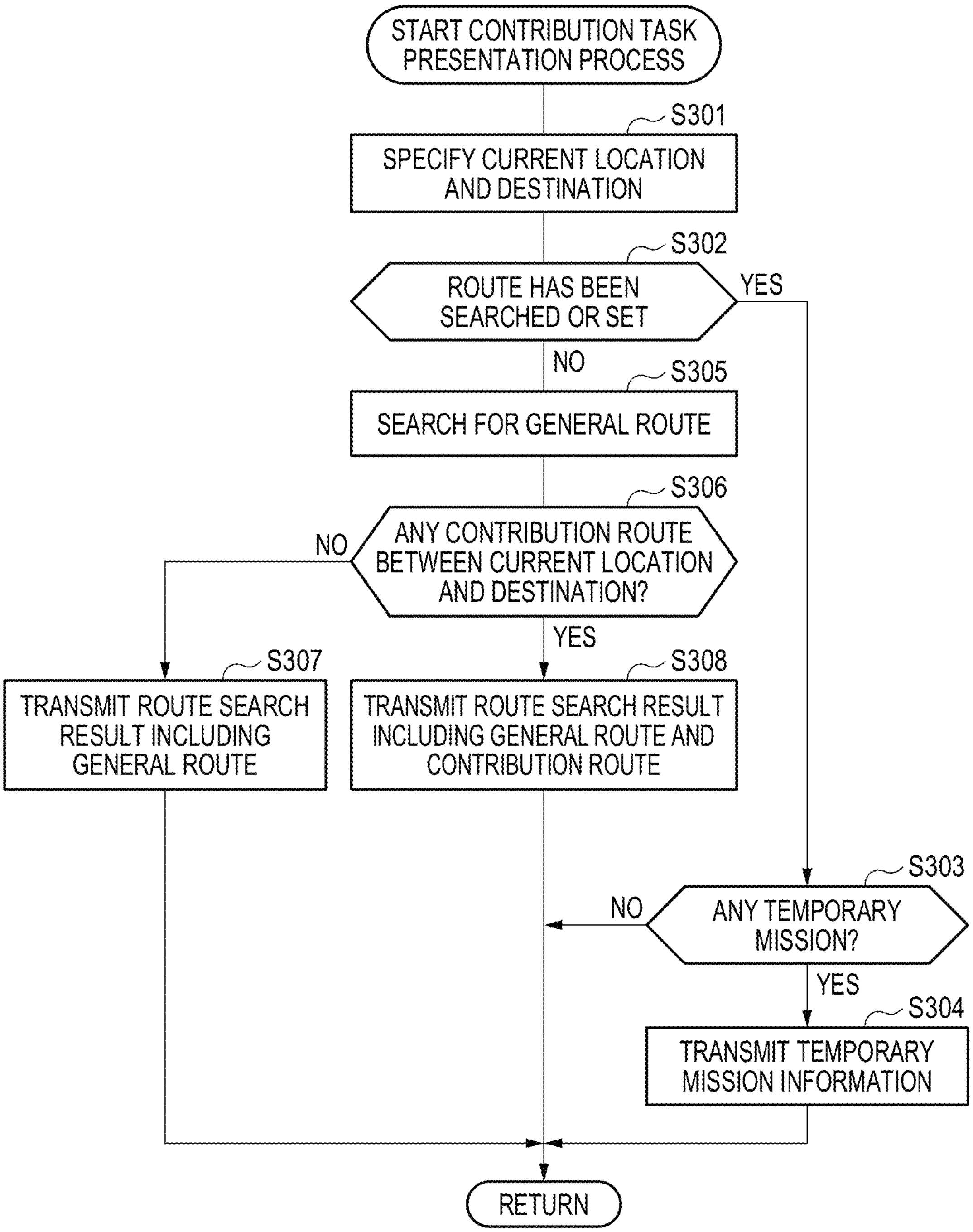
FIG. 14 is a flowchart illustrating an example of a contribution task presentation process executed by the server according to Embodiment 1.

FIG. 14 is a flowchart illustrating an example of the contribution task presentation process executed by the server 20 according to Embodiment 1. This process is called in step S103 in FIG. 12.

The server 20 specifies a current location and a destination from the route search request received from the vehicle 10 (S301).

The server 20 determines whether the route of the vehicle 10 has been searched or set (S302).

When the route has been searched or set (S302: YES), the server 20 determines whether there is a temporary mission between the current location and the destination (S303). When there is no temporary mission between the current location and the destination (S303: NO), the server 20 causes the process to return to the caller (S103). When there is a temporary mission between the current location and the destination (S303: YES), the server 20 transmits the temporary mission information to the vehicle 10 (S304), and causes the process to return to the caller (S103).

When the route has not been searched or set (S302: NO), the server 20 searches for a general route from the current location to the destination (S305).

The server 20 refers to the contribution task DB 24 and determines whether there is a contribution route between the current location and the destination (S306).

When there is no contribution route between the current location and the destination (S306: NO), the server 20 transmits a route search result including the searched general route to the vehicle 10 (S307), and causes the process to return to the caller (S103).

When there is a contribution route between the current location and the destination (S306: YES), the server 20 transmits, to the vehicle 10, a route search result including the searched general route, the contribution route present between the current location and the destination, and given points when the vehicle 10 completes the contribution route (S308), and causes the process to return to the caller (S103).

Through the above processes, the server 20 can transmit the contribution route to the vehicle 10 together with the general route. The general route may be read as a first route, and the contribution route may be read as a second route. A distance (first distance) of the general route (first route) may be shorter than a distance (second distance) of the contribution route (second route). In other words, the distance (second distance) of the contribution route (second route) may be longer than the distance (first distance) of the general route (first route). This is because, even if the distance of the contribution route is longer than the distance of the general route, points can be given, and the user is motivated to select the contribution route.

<Contribution Task Reception Process>

Figure 15:
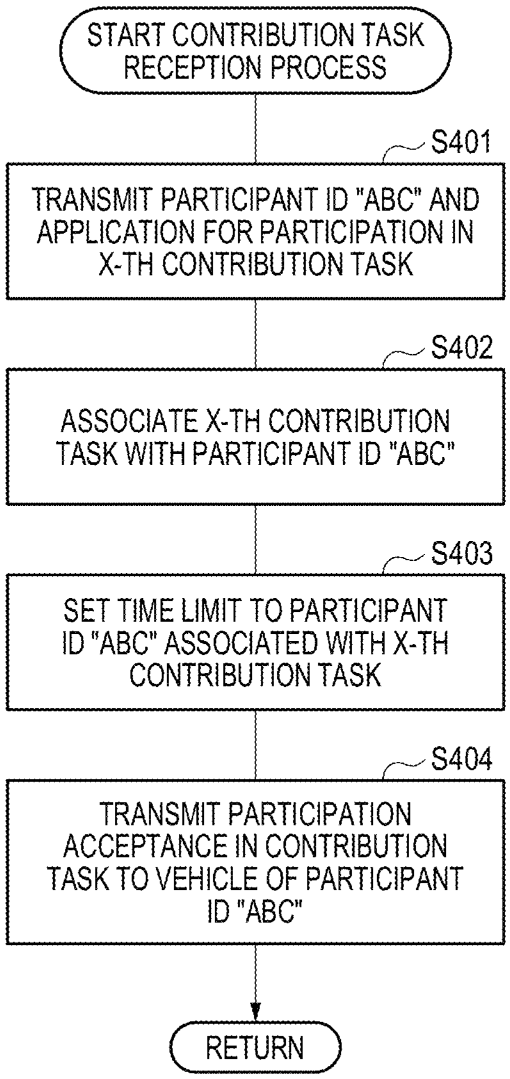
FIG. 15 is a flowchart illustrating an example of a contribution task reception process executed by the server according to Embodiment 1.

FIG. 15 is a flowchart illustrating an example of a contribution task reception process executed by the server 20 according to Embodiment 1. This process is called in step S105 in FIG. 12.

The server 20 receives, from the vehicle 10, a participant ID (for example, a participant ID "ABC") and information indicating an application for the participation in an X-th contribution task (S401). The participant ID is an ID for identifying a user (or a vehicle) who participates in a contribution task.

The server 20 manages the X-th contribution task in association with the participant ID "ABC" (S402). Accordingly, the server 20 manages that a user with the participant ID "ABC" is participating in the X-th contribution task.

The server 20 sets a time limit of the contribution task for the participant ID "ABC" associated with the X-th contribution task, and starts counting down the time limit (S403). That is, the server 20 manages a time limit for each participant in the X-th contribution task.

The server 20 transmits information indicating participation acceptance in the contribution task to the vehicle 10 of the user of the participant ID "ABC" (S404), and causes the process to return to the caller (S105).

The process illustrated in FIG. 15 may be executed for each user participating in the X-th contribution task. Accordingly, the server 20 manages each user participating in the X-th contribution task and the time limit.

<Contribution Task Execution Process>

Figure 16:
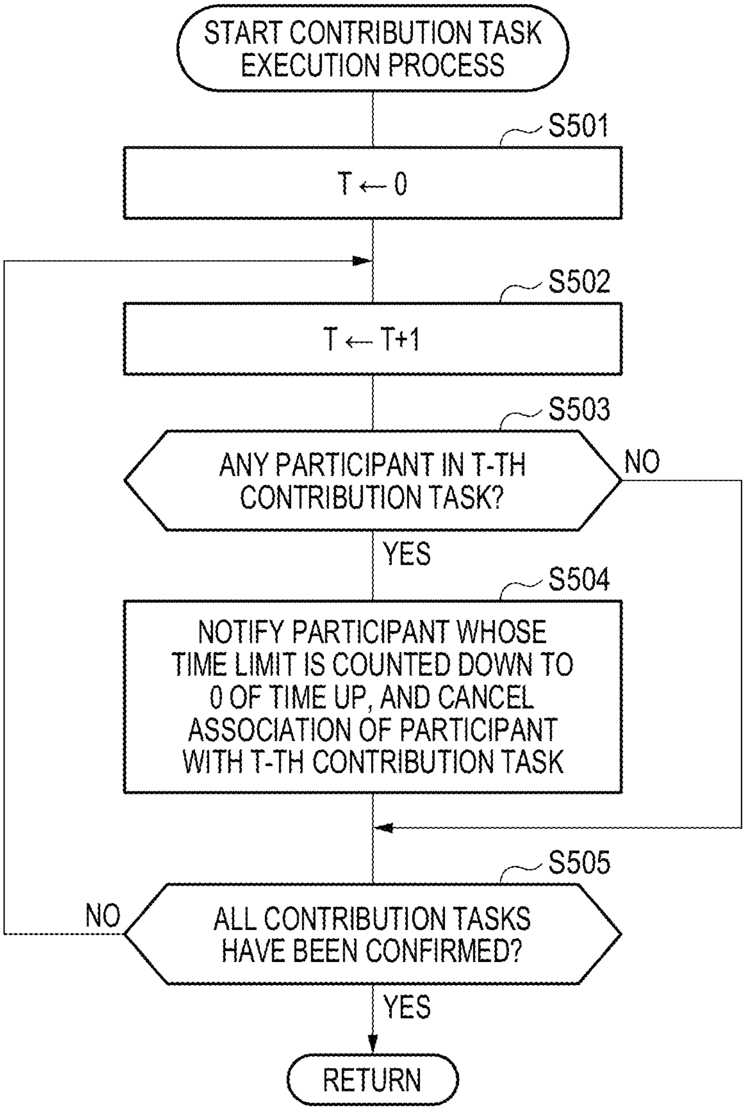
FIG. 16 is a flowchart illustrating an example of a contribution task execution process executed by the server according to Embodiment 1.

FIG. 16 is a flowchart illustrating an example of the contribution task execution process executed by the server 20 according to Embodiment 1. This process is called in step S108 in FIG. 12.

The server 20 substitutes 0 for a variable T (that is, initializes) (S501).

The server 20 adds 1 to the variable T (S502).

The server 20 determines whether there is a participant in the T-th contribution task (S503).

When there is a participant in the T-th contribution task (S503: YES), the server 20 notifies the vehicle 10 of the user of a participant ID whose time limit is counted down to 0 that the time limit of the contribution task has exceeded (time up), and cancels the association of the participant ID with the T-th contribution task (S504). Accordingly, the server 20 deletes, from the contribution task, the user who has participated in the contribution task and timed up. Then, the server 20 causes the process to proceed to step S505.

When there is no participant in the T-th contribution task (S503: NO), the server 20 causes the process to proceed to step S505.

The server 20 determines whether all the contribution tasks have been confirmed (S505).

When there is a contribution task that has not been confirmed (S505: NO), the server 20 causes the process to return to step S502. When all the contribution tasks have been confirmed (S505: YES), the server 20 causes the process to return to the caller (S108).

<Validity Check Process>

Figure 17:
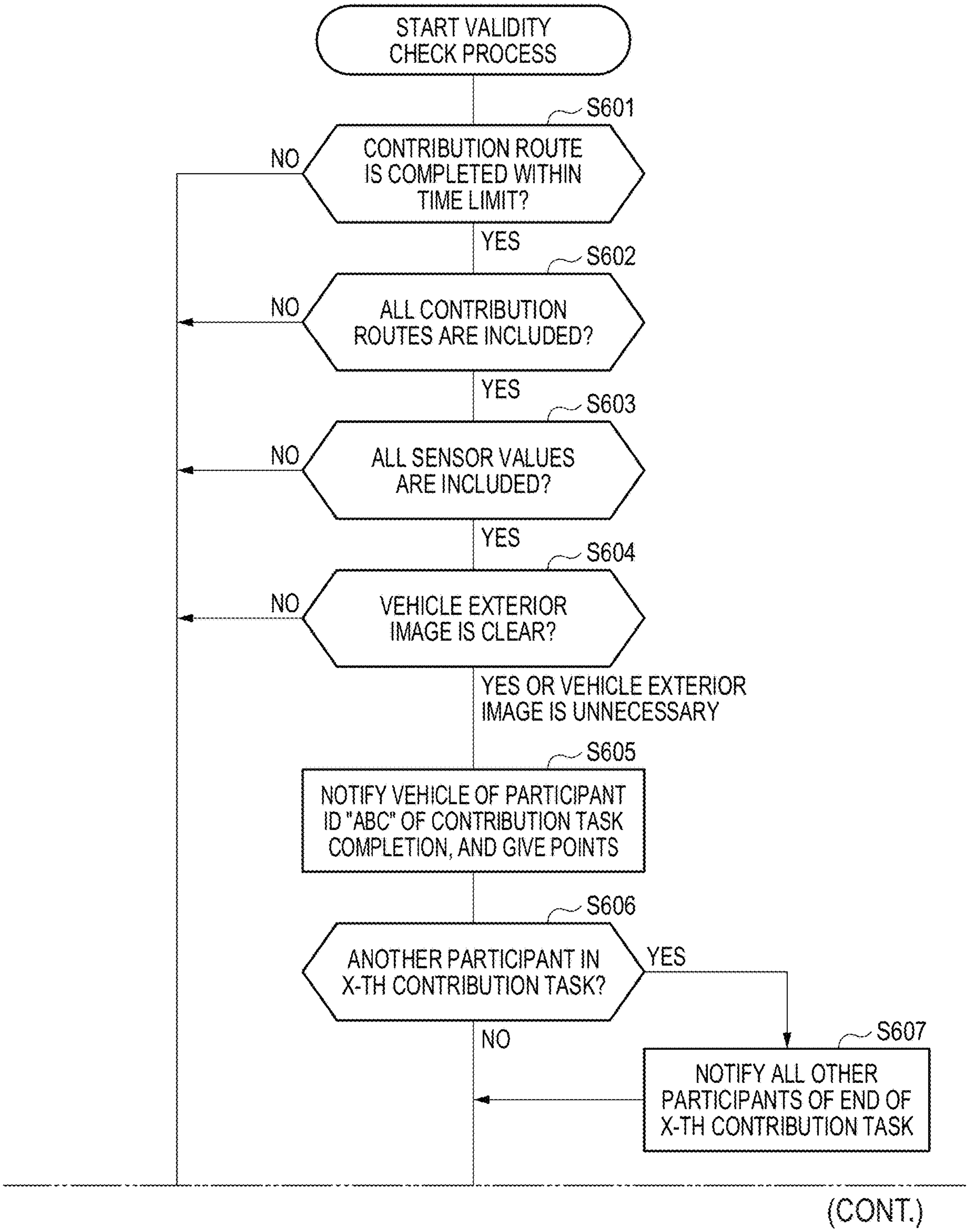
FIG. 17 is a flowchart illustrating an example of a validity check process executed by the server according to Embodiment 1.

FIG. 17 is a flowchart illustrating an example of the validity check process executed by the server 20 according to Embodiment 1. This process is called in step S107 in FIG. 12.

The server 20 analyzes the vehicle external information received from the vehicle 10 and determines whether the vehicle 10 has completed the contribution route within the time limit (S601).

When the vehicle 10 has not completed the contribution route within the time limit (S601: NO), the server 20 transmits information indicating the contribution task failure and the reason thereof to the vehicle 10 of the participant ID "ABC" (S620), and causes the process to return to the caller (S107).

When the contribution route has been completed within the time limit (S601: YES), the server 20 determines whether all of a start point, an end point, and a section of the contribution route are included in a travel path indicated by the vehicle external information (S602).

When at least a part of the start point, the end point, and the section of the contribution route is not included in the travel path indicated by the vehicle external information (S602: NO), the server 20 causes the process to proceed to step S620.

When all of the start point, the end point, and the section of the contribution route are included in the travel path indicated by the vehicle external information (S602: YES), the server 20 determines whether all predetermined sensor values are included in the vehicle external information (S603).

When at least a part of the predetermined sensor values is not included in the vehicle external information (S603: NO), the server 20 causes the process to proceed to step S620.

When all the predetermined sensor values are included in the vehicle external information (S603: YES), the server 20 determines whether the vehicle exterior image included in the vehicle external information is clear (S604).

When the vehicle exterior image included in the vehicle external information is unclear (S604: NO), the server 20 causes the process to proceed to step S620.

When the vehicle exterior image included in the vehicle external information is clear (S604: YES), or when the vehicle exterior image is unnecessary, the server 20 notifies the vehicle 10 of the user of the participant ID "ABC" of the contribution task completion, and gives points (S605).

The server 20 determines whether there is another participant in the X-th contribution task (S606).

When there is another participant in the X-th contribution task (S606: YES), the server 20 notifies all the other participants of the end of the X-th contribution task (S607), and causes the process to proceed to step S608. As illustrated in steps S605 to S607, the server 20 may give an incentive (points) to a user (vehicle 10) who has completed the contribution route first, and may not provide an incentive (points) to a user (vehicle 10) who has completed the contribution route second or later.

When there is no other participant in the X-th contribution task (S606: NO), the server 20 causes the process to proceed to step S608.

The server 20 deletes the X-th contribution task (S608).

The server 20 reflects the sensor value, the vehicle exterior image, and the like obtained from the vehicle external information in the Y-th road information of the map DB 23 (S609). Here, the Y-th road information indicates road information collected by the X-th contribution task.

The server 20 newly sets an expiration date of the Y-th road information in the map DB 23 (S610), and causes the process to return to the caller (S107). The server 20 may set an expiration date (for example, one week or one month) according to the content of the road information.

<Overall Process of Vehicle>

Figure 18:
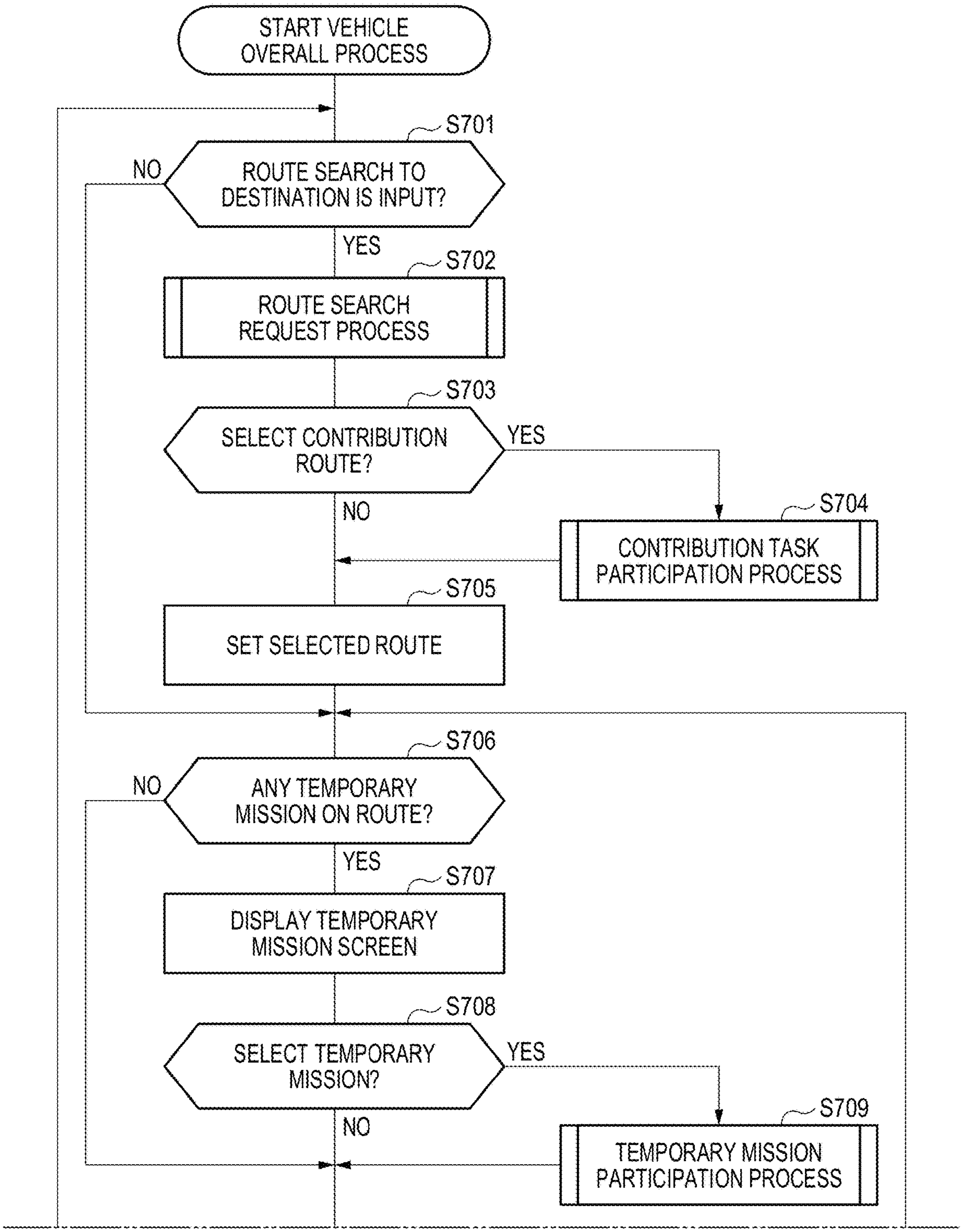
FIG. 18 is a flowchart illustrating an example of an overall process executed by a vehicle according to Embodiment 1.
Figure 19:
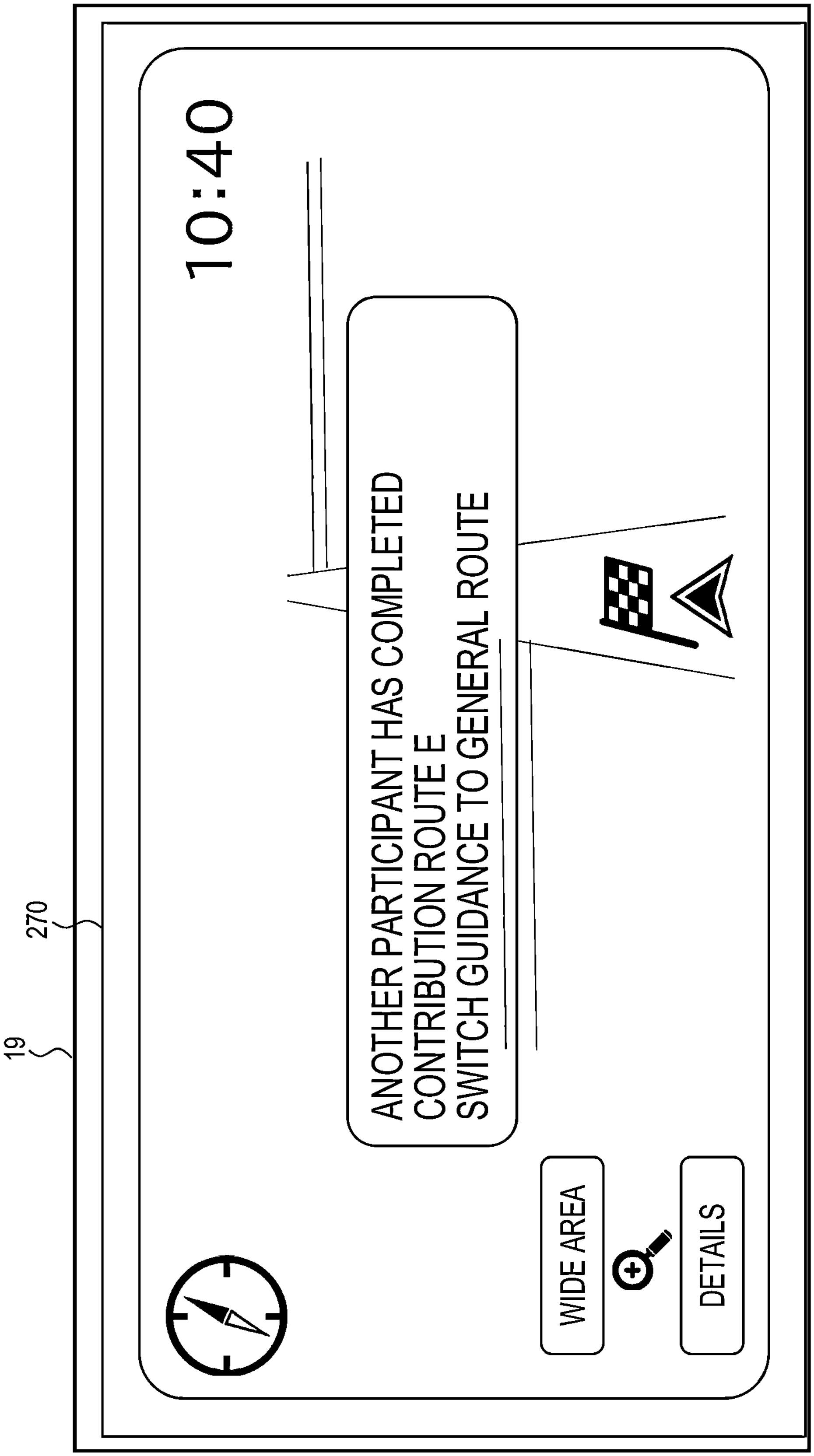
FIG. 19 shows an example of a contribution task end screen according to Embodiment 1.

FIG. 18 is a flowchart illustrating an example of an overall process executed by the vehicle according to Embodiment 1. FIG. 19 is a diagram illustrating an example of a contribution task end screen according to Embodiment 1. In the description of FIGS. 18 to 22, the processes mainly executed by the vehicle 10 may be read as processes mainly executed by the IVI device 15 included in the vehicle 10 or another device.

The vehicle 10 determines whether a route search to the destination is input from the user through the input device 18 (S701).

When the route search from the user to the destination is not input (S701: NO), the vehicle 10 causes the process to proceed to S706.

When the route search from the user to the destination is input (S701: YES), the vehicle 10 executes a route search request process (S702). Although details of the route search request process will be described later (see FIG. 20), the vehicle 10 displays the route selection screen 200 illustrated in FIG. 4 and obtains the route selected by the user by the process.

The vehicle 10 determines whether the user selects a contribution route from route candidates (S703).

When the user selects the contribution route (S703: YES), the vehicle 10 executes a contribution task participation process (S704), and causes the process to proceed to step S705. Details of the contribution task participation process will be described later (see FIG. 21).

When the user does not select the contribution route (for example, when the user selects the general route) (S703: NO), the vehicle 10 causes the process to proceed to step S705.

The vehicle 10 sets the route selected by the user and starts guidance (navigation) (S705). When the user selects the contribution route (that is, when step S704 is executed), the vehicle 10 may set the contribution route.

The vehicle 10 periodically inquires of the server 20 whether there is a temporary mission on the route, and determines whether there is a temporary mission on the route (S706).

When there is no temporary mission on the route (S706: NO), the vehicle 10 causes the process to proceed to step S710.

When there is a temporary mission on the route (S706: YES), the vehicle 10 displays the temporary mission screen 260 on the display device 19 as illustrated in FIG. 11 (S707).

The vehicle 10 determines whether the user selects participation in the temporary mission (S708).

When the user selects participation in the temporary mission (S708: YES), the vehicle 10 executes a temporary mission participation process (S709), and causes the process to proceed to step S710. Details of the temporary mission participation process will be described later (see FIG. 22).

When the user does not select participation in the temporary mission (S708: NO), the vehicle 10 causes the process to proceed to step S710.

The vehicle 10 determines whether the vehicle 10 has arrived at an ending location of the contribution task (S710). The ending location of the contribution task may be the same as the destination or may be different from the destination.

When the vehicle 10 has arrived at the ending location of the contribution task (S710: YES), the vehicle 10 displays the arrival at the ending location and transmits vehicle external information (including the participant ID, the travel path, the vehicle exterior image, the sensor values, and the like) to the server 20 (S711). The vehicle 10 then causes the process to proceed to step S712.

When the vehicle 10 has not arrived at the ending location of the contribution task (S710: NO), the vehicle 10 causes the process to proceed to step S712.

The vehicle 10 determines whether a notification of the contribution task end is received from the server 20 (S712).

When the notification of the contribution task end is received from the server 20 (S712: YES), the vehicle 10 displays a contribution task end screen during participation on the display device (S713), and causes the process to proceed to step S714. For example, when the user has completed the contribution task, when the time limit is exceeded, or when another participant has completed the contribution task, the contribution task ends. For example, when another participant has completed the contribution task, the vehicle 10 displays a contribution task end screen 270 as illustrated in FIG. 19. In this case, since another participant has completed the contribution task, the contribution task end screen 270 may display that the contribution task is ended and the guidance is switched to the guidance of the general route. That is, when another participant has completed the contribution task, the vehicle 10 participating in the contribution task may switch the guidance from the contribution route to the general route.

When the notification of the contribution task end is not received from the server 20 (S712: NO), the vehicle 10 causes the process to proceed to step S714.

The vehicle 10 determines whether the vehicle 10 has arrived at a navigation destination (S714).

When the vehicle 10 has not arrived at the navigation destination (S714: NO), the vehicle 10 causes the process to return to step S706.

When the vehicle 10 has arrived at the navigation destination (S714: YES), the vehicle 10 ends the navigation (S715), and causes the process to return to step S701.

<Route Search Request Process>

Figure 20:
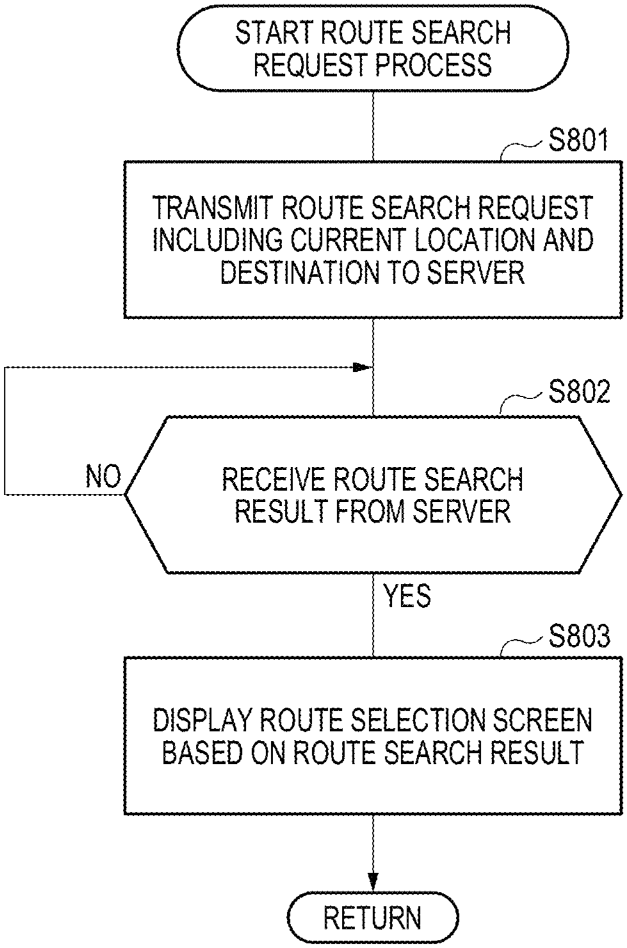
FIG. 20 is a flowchart illustrating an example of a route search request process executed by the vehicle according to Embodiment 1.

FIG. 20 is a flowchart illustrating an example of the route search request process executed by the vehicle according to Embodiment 1. This process is called in step S702 in FIG. 18.

The vehicle 10 transmits a route search request including the current location and the destination to the server (S801).

The vehicle 10 waits until the route search result is received from the server 20 (S802: NO), and when the route search result is received from the server 20 (S802: YES), the process proceeds to step S803. The route search result includes, for example, an X-th contribution route, a Z-th contribution route, and given points in addition to the general route (for example, the shortest route, the fastest route, the ECO route, and the standard route).

The vehicle 10 displays a route selection screen 200 as illustrated in FIG. 2 on the display device 19 based on the received route search result (S803), and causes the process to return to the caller (S702).

<Contribution Task Participation Process>

Figure 21:
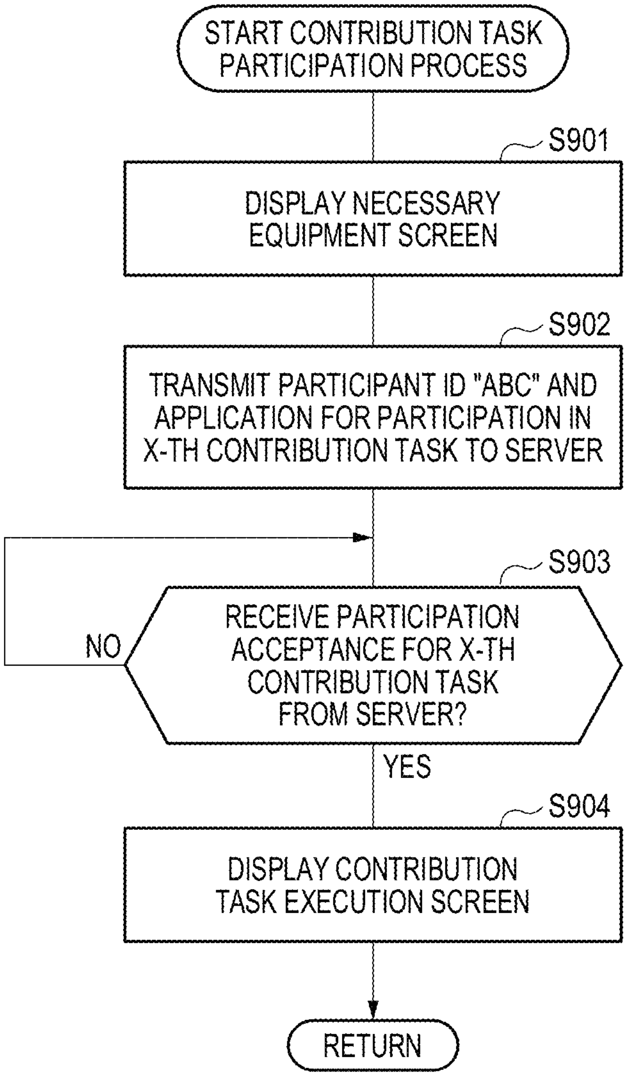
FIG. 21 is a flowchart illustrating an example of a contribution task participation process executed by the vehicle according to Embodiment 1.

FIG. 21 is a flowchart illustrating an example of the contribution task participation process executed by the vehicle according to Embodiment 1. This process is called in step S704 in FIG. 18. The following is a processing example when the user selects the X-th contribution route.

The vehicle 10 displays the necessary equipment screen 210 as illustrated in FIG. 5 on the display device 19 (S901).

The vehicle 10 transmits information including the participant ID "ABC" and an application for the participation in the X-th contribution task to the server (S902).

The vehicle 10 waits until the participation acceptance for the X-th contribution task is received from the server 20 (S903: NO), and when the participation acceptance for the X-th contribution task is received from the server 20 (S903: YES), the process proceeds to step S904.

The vehicle 10 displays the contribution task execution screen 220 as illustrated in FIG. 6 on the display device 19 (S903), and causes the process to return to the caller (S704).

<Temporary Mission Participation Process>

Figure 22:
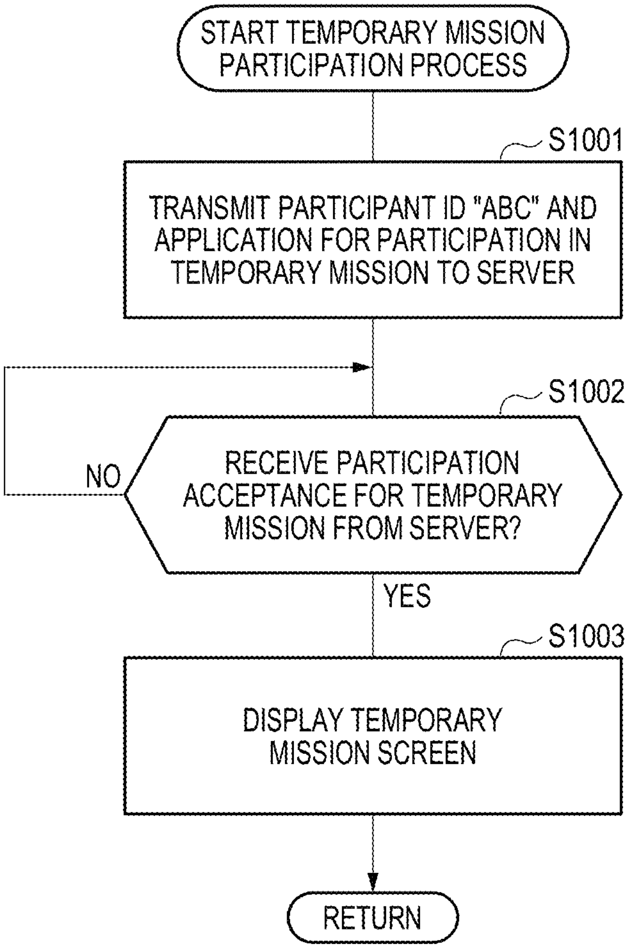
FIG. 22 is a flowchart illustrating an example of a temporary mission participation process executed by the vehicle according to Embodiment 1.

FIG. 22 is a flowchart illustrating an example of the temporary mission participation process executed by the vehicle 10 according to Embodiment 1. This process is called in step S709 in FIG. 18.

The vehicle 10 transmits information including the participant ID "ABC" and an application for the participation in the temporary mission to the server (S1001).

The vehicle 10 waits until the participation acceptance for the temporary mission is received from the server 20 (S1002: NO), and when the participation acceptance for the temporary mission is received from the server 20 (S1002: YES), the process proceeds to step S1003.

The vehicle 10 displays the temporary mission screen 260 as illustrated in FIG. 11 on the display device 19 (S1003), and causes the process to return to the caller (S709).

Summary of Embodiment 1

The following techniques are disclosed from the above description of Embodiment 1.

<Technique 1>

A control method for a display device (19), an input device (18), an external information acquisition device (16), and a transmission device (for example, the communication device 11) mounted on a vehicle (10) according to Embodiment 1 includes: displaying, by the display device, a first route (for example, general route) to a predetermined destination and a second route (for example, contribution route)

different from the first route, the second route displayed on the display device also indicating that information outside the vehicle is collected during traveling of the second route and is transmitted to outside; displaying, by the display device, a guidance display for guiding the second route when the second route is selected by operating the input device; acquiring, by the external information acquisition device, vehicle external information on the second route; and transmitting, by the transmission device, the vehicle external information to the outside.

Accordingly, when the second route is selected, the vehicle can acquire and transmit the vehicle external information on the second route while traveling along the second route. Thus, for example, the server (20) can receive the external vehicle information on the second route from the vehicle and update the road information on the road corresponding to the second route.

<Technique 2>

In the control method according to Technique 1, a first distance of the first route is shorter than a second distance of the second route.

Thus, the first distance of the first route may be shorter than the second distance of the second route. In other words, the second distance of the second route may be longer than the first distance of the first route.

<Technique 3>

In the control method according to Technique 1 or 2, the second route displayed on the display device also indicates an incentive when the vehicle completes the second route, and the incentive is given when the vehicle completes the second route after the second route is selected by operating the input device.

Accordingly, in order to obtain the incentive, the user of the vehicle is more likely to select the second route and complete the second route. Therefore, for example, the server is more likely to collect the external vehicle information on the second route, and can efficiently update the road information corresponding to the second route.

<Technique 4>

In the control method according to any one of Techniques 1 to 3, the second route displayed on the display device also indicates a time limit for completing the second route.

Accordingly, the user of the vehicle can check the time limit for completing the second route.

<Technique 5>

In the control method according to any one of Techniques 1 to 4, the incentive is given when the vehicle completes the second route within the time limit after the second route is selected by operating the input device, and the incentive is not given when the vehicle does not complete the second route within the time limit after the second route is selected by operating the input device.

Accordingly, the user of the vehicle completes the second route within the time limit in order to obtain the incentive. Accordingly, for example, the server is more likely to collect the external vehicle information on the second route in a short period, and can efficiently update the road information corresponding to the second route.

<Technique 6>

In the control method according to any one of Techniques 1 to 5, the second route displayed on the display device also indicates the number of other vehicles traveling along the second route.

Accordingly, the user of the vehicle can check the number of other vehicles participating in the completion of the second route.

<Technique 7>

In the control method according to any one of Techniques 1 to 6, the incentive is given when the second route is first completed, and the incentive is not given when the second route is completed second and subsequently.

Accordingly, the user of the vehicle first completes the second route in order to obtain the incentive. Accordingly, for example, the server is more likely to collect the external vehicle information on the second route in a short period, and can efficiently update the road information corresponding to the second route.

<Technique 8>

In the control method according to any one of Techniques 1 to 7, when the second route is selected by operating the input device, the display device displays the guidance display for guiding the second route after the display device displays necessary equipment necessary for traveling along the second route.

Accordingly, the user of the vehicle can check necessary items necessary for completing the second route in advance.

<Technique 9>

In the control method according to Technique 8, when the second route is selected by operating the input device, the display device displays the necessary equipment necessary for traveling along the second route, and thereafter, when the input device is operated to input that the necessary equipment is confirmed, the display device displays the guidance display for guiding the second route.

Accordingly, the user of the vehicle can check necessary items necessary for completing the second route in advance and can participate in the completion of the second route reliably and safely.

<Technique 10>

In the control method according to any one of Techniques 1 to 9, the external information acquisition device includes at least one of a camera mounted on the vehicle and configured to acquire an external image, a sonar mounted on the vehicle and configured to detect an external obstacle using sound waves, a radar mounted on the vehicle and configured to detect an external obstacle using electromagnetic waves, a speedometer mounted on the vehicle and configured to detect a speed of the vehicle, an accelerometer mounted on the vehicle and configured to detect an acceleration of the vehicle, and an angular accelerometer mounted on the vehicle and configured to detect an angular acceleration of the vehicle.

Accordingly, the vehicle can transmit at least one of the external image, the external obstacle, the speed of the vehicle, the acceleration of the vehicle, or the angular acceleration of the vehicle to the outside as the vehicle external information.

<Technique 11>

In the vehicle (10) on which the display device (19), the input device (18), the external information acquisition device (16), and a transmission device (for example, the communication device 11) are mounted, the display device displays a first route (for example, general route) to a predetermined destination and a second route (for example, contribution route) different from the first route, the second route displayed on the display device also indicates that information outside the vehicle is collected during traveling of the second route and is transmitted to outside, the display device displays a guidance display for guiding the second route when the second route is selected by operating the input device, the external information acquisition device acquires vehicle external information on the second route, and the transmission device transmits the vehicle external information to outside.

Accordingly, when the second route is selected, the vehicle can acquire and transmit the vehicle external information on the second route while traveling along the second route. Thus, for example, the server (20) can receive the external vehicle information on the second route from the vehicle and update the road information on the road corresponding to the second route.

<Technique 12>

In the vehicle according to Technique 11, a first distance of the first route is shorter than a second distance of the second route.

Thus, the first distance of the first route may be shorter than the second distance of the second route. In other words, the second distance of the second route may be longer than the first distance of the first route.

<Technique 13>

In the vehicle according to Technique 11 or 12, the second route displayed on the display device also indicates an incentive when the vehicle completes the second route, and the incentive is given when the vehicle completes the second route after the second route is selected by operating the input device.

Accordingly, in order to obtain the incentive, the user of the vehicle is more likely to select the second route and complete the second route. Therefore, for example, the server is more likely to collect the external vehicle information on the second route, and can efficiently update the road information corresponding to the second route.

<Technique 14>

In the vehicle according to Techniques 11 to 13, the second route displayed on the display device also indicates a time limit for completing the second route.

Accordingly, the user of the vehicle can check the time limit for completing the second route.

<Technique 15>

In the vehicle according to Techniques 11 to 14, the incentive is given when the vehicle completes the second route within the time limit after the second route is selected by operating the input device, and the incentive is not given when the vehicle does not complete the second route within the time limit after the second route is selected by operating the input device.

Accordingly, the user of the vehicle completes the second route within the time limit in order to obtain the incentive. Therefore, for example, the server is more likely to collect the external vehicle information on the second route in a short period, and can efficiently update the road information corresponding to the second route.

<Technique 16>

In the vehicle according to any one of Techniques 11 to 15, the second route displayed on the display device also indicates the number of other vehicles traveling along the second route.

Accordingly, the user of the vehicle can check the number of other vehicles participating in the completion of the second route.

<Technique 17>

In the vehicle according to any one of Techniques 11 to 16, the incentive is given when the second route is first completed, and the incentive is not given when the second route is completed second and subsequently.

Accordingly, the user of the vehicle first completes the second route in order to obtain the incentive. Therefore, for example, the server is more likely to collect the external vehicle information on the second route in a short period, and can efficiently update the road information corresponding to the second route.

<Technique 18>

In the vehicle according to any one of Techniques 11 to 17, when the second route is selected by operating the input device, the display device displays the guidance display for guiding the second route after the display device displays necessary equipment necessary for traveling along the second route.

Accordingly, the user of the vehicle can check necessary items necessary for completing the second route in advance.

<Technique 19>

In the vehicle according to Technique 18, when the second route is selected by operating the input device, the display device displays the necessary equipment necessary for traveling along the second route, and thereafter, when the input device is operated to input that the necessary equipment is confirmed, the display device displays the guidance display for guiding the second route.

As a result, the user of the vehicle can check necessary items necessary for completing the second route in advance and can participate in the completion of the second route reliably and safely.

<Technique 20>

In the vehicle according to any one of Techniques 11 to 19, the external information acquisition device includes at least one of a camera mounted on the vehicle and configured to acquire an external image, a sonar mounted on the vehicle and configured to detect an external obstacle using sound waves, a radar mounted on the vehicle and configured to detect an external obstacle using electromagnetic waves, a speedometer mounted on the vehicle and configured to detect a speed of the vehicle, an accelerometer mounted on the vehicle and configured to detect an acceleration of the vehicle, and an angular accelerometer mounted on the vehicle and configured to detect an angular acceleration of the vehicle.

Accordingly, the vehicle can transmit at least one of the external image, the external obstacle, the speed of the vehicle, the acceleration of the vehicle, or the angular acceleration of the vehicle to the outside as the vehicle external information.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiment described above may be combined freely in a range without departing from the gist of the invention.

INDUSTRIAL APPLICABILITY

The technique of the present disclosure is useful for a system, a device, a vehicle, a method, a computer program, and the like for collecting information indicating a road, a situation around the road, and the like.

CROSS-REFERENCE TO RELATED APPLICATIONS

This application is based on and claims priority under 35 USC 119 from Japanese Patent Application No. 2024-013434 filed on Jan. 31, 2024, the contents of which are incorporated herein by reference.

What is claimed is:

1. A control method for a display, an input, an external information acquisition sensor, and a transmitter mounted on a vehicle, the control method comprising:

displaying, on the display, a first route to a predetermined destination and a second route different from the first route, the second route displayed on the display also indicating that information outside the vehicle is collected while the vehicle is traveling along the second route and the information is transmitted to an external entity;

displaying, on the display, a guidance display for guiding the second route when the second route is selected by operating the input;

acquiring, by the external information acquisition sensor, vehicle external information on the second route; and transmitting, by the transmitter, the vehicle external information to the external entity, wherein:

a first distance of the first route is shorter than a second distance of the second route, the second route displayed on the display also indicates:

an incentive when the vehicle completes the second route, and a time limit for completing the second route, the incentive is given when the vehicle completes the second route within the time limit after the second route is selected by operating the input, and the incentive is not given when the vehicle does not complete the second route within the time limit after the second route is selected by operating the input.

2. The control method according to claim 1, wherein the second route displayed on the display also indicates a number of other vehicles traveling along the second route.

3. The control method according to claim 2, wherein the incentive is given when the second route is first completed, and the incentive is not given when the second route is completed second and subsequently.

4. The control method according to claim 1, wherein when the second route is selected by operating the input, the display displays the guidance display for guiding the second route after the display displays necessary equipment necessary for traveling along the second route.

5. The control method according to claim 4, wherein when the second route is selected by operating the input, the display displays the necessary equipment necessary for traveling along the second route, and then when the input is operated to input that the necessary equipment is confirmed, the display displays the guidance display for guiding the second route.

6. The control method according to claim 1, wherein the external information acquisition sensor includes at least one of a camera mounted on the vehicle and acquiring an external image, a sonar mounted on the vehicle and detecting an external obstacle using sound waves, a radar mounted on the vehicle and detecting the external obstacle using electromagnetic waves, a speedometer mounted on the vehicle and detecting a speed of the vehicle, an accelerometer mounted on the vehicle and detecting an acceleration of the vehicle, and an angular accelerometer mounted on the vehicle and detecting an angular acceleration of the vehicle.

7. A vehicle comprising:

a display;

an input;

an external information acquisition sensor; and a transmitter, wherein the display displays a first route to a predetermined destination and a second route different from the first route, the second route displayed on the display also indicates that information outside the vehicle is collected during traveling of the second route and is transmitted to an external entity, the display displays a guidance display for guiding the second route when the second route is selected by operating the input, the external information acquisition sensor acquires vehicle external information on the second route, and the transmitter transmits the vehicle external information to the external entity, a first distance of the first route is shorter than a second distance of the second route, the second route displayed on the display also indicates:

an incentive when the vehicle completes the second route, and a time limit for completing the second route, the incentive is given when the vehicle completes the second route within the time limit after the second route is selected by operating the input, and the incentive is not given when the vehicle does not complete the second route within the time limit after the second route is selected by operating the input.

8. The vehicle according to claim 7, wherein the second route displayed on the display also indicates a number of other vehicles traveling along the second route.

9. The vehicle according to claim 8, wherein the incentive is given when the second route is first completed, and the incentive is not given when the second route is completed second and subsequently.

10. The vehicle according to claim 7, wherein when the second route is selected by operating the input, the display displays the guidance display for guiding the second route after the display displays necessary equipment necessary for traveling along the second route.

11. The vehicle according to claim 10, wherein when the second route is selected by operating the input, the display displays the necessary equipment necessary for traveling along the second route, and then when the input is operated to input that the necessary equipment is confirmed, the display displays the guidance display for guiding the second route.

12. The vehicle according to claim 7, wherein the external information acquisition sensor includes at least one of a camera mounted on the vehicle and acquiring an external image, a sonar mounted on the vehicle and detecting an external obstacle using sound waves, a radar mounted on the vehicle and detecting external obstacle using electromagnetic waves, a speedometer mounted on the vehicle and detecting a speed of the vehicle, an accelerometer mounted on the vehicle and detecting an acceleration of the vehicle, and an angular accelerometer mounted on the vehicle and detecting an angular acceleration of the vehicle.

* * * * *